(12) United States Patent
Kim et al.

(10) Patent No.: US 6,677,724 B1
(45) Date of Patent: Jan. 13, 2004

(54) INITIAL MAGNETIC POLE ESTIMATING DEVICE FOR AC SYNCHRONOUS MOTOR

(75) Inventors: Tae-Woong Kim, Aalborg East (DK); Junichi Watanabe, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/088,355

(22) PCT Filed: Sep. 13, 2000

(86) PCT No.: PCT/JP00/06270
§ 371 (c)(1),
(2), (4) Date: Mar. 15, 2002

(87) PCT Pub. No.: WO01/22568
PCT Pub. Date: Mar. 29, 2001

(30) Foreign Application Priority Data

Sep. 17, 1999 (JP) ............................................ 11/264556
Jul. 21, 2000 (JP) ...................................... 2000/221364

(51) Int. Cl.[7] .................................................. H02P 1/46
(52) U.S. Cl. ...................... 318/700; 318/701; 318/800; 318/799; 318/811
(58) Field of Search ................................. 318/700, 701, 318/800, 799, 811, 687, 715, 438, 722, 138, 254, 439

(56) References Cited

U.S. PATENT DOCUMENTS 5,652,491 A * 7/1997 Ikawa et al. ................. 318/632
6,198,240 B1 * 3/2001 Notohara et al. ............ 318/268
6,344,725 B2 * 2/2002 Kaitani et al. ............... 318/700
6,518,718 B2 * 2/2003 Koga et al. ..................... 318/38

FOREIGN PATENT DOCUMENTS

JP 6-153576 5/1994
JP 11-098885 4/1999

* cited by examiner

Primary Examiner—Karen Masih
(74) Attorney, Agent, or Firm—Sughrue Mion, PLLC

(57) ABSTRACT

Initial magnetic pole estimating apparatus for an AC synchronous motor equipped in an AC synchronous motor controller, which has a speed gain control unit, mode section determining means, first command torque calculating means for selecting a first or a second cyclic section in accordance with the result in the mode section determining means, and determining whether or not a command speed is in a data acquisition speed section when the first cyclic section is selected, and calculating first command torque data from a command torque in the data acquisition speed section, second command torque calculating means for determining whether or not the command speed is in the data acquisition speed section when the second cyclic section is selected, and calculating second command torque data from the command torque in the data acquisition speed section, and estimated initial magnetic pole calculating means for calculating an estimated initial magnetic pole position using information on the first command torque data and second command torque data.

32 Claims, 16 Drawing Sheets

INITIAL MAGNETIC POLE ESTIMATING DEVICE FOR AC SYNCHRONOUS MOTOR

TECHNICAL FIELD

The present invention relates to a permanent magnet type AC synchronous motor including a linear and a rotary motor, wherein initial magnetic poles of the AC synchronous motor are estimated without using a magnetic pole sensor (pole sensor).

BACKGROUND ART

Information on an initial magnetic pole position detected from a magnetic pole sensor is required when an AC synchronous motor is started, such that the AC synchronous motor operates in accordance with commands based on correct information on a detected initial magnetic pole position. There may arise such problems as when the information on the detected initial magnetic pole position shifts from the magnetic pole position of the AC synchronous motor by ±90 degrees, no torque is generated so that the AC synchronous motor does not operate, and when the shift exceeds ±90 degrees, the AC synchronous motor reversely rotates as opposed to a command. From such reasons, the correct information on a detected initial magnetic pole position is critical in the AC synchronous motor, so that a variety of initial magnetic pole estimating methods have been devised for AC synchronous motor in order to acquire correct information on a detected initial magnetic pole position. A relationship between an offset angle of an initial magnetic pole position and a generated torque (hereinafter, a thrust force of a linear motor is also shown as a torque) is represented by Equation (1) and shown in FIG. 16.

$$T = Tm \times \cos(\theta_{error}) \quad (1)$$

where T is a generated torque, Tm is a maximum value of the torque, and θerror is an offset angle of the initial magnetic pole position.

A prior art technique described in Japanese Patent Laid-Open No. 153576/1994 applies a voltage corresponding to an arbitrary initial magnetic pole position angle to estimate the initial magnetic pole position from information on a rotating direction and a rotational speed of a motor at that time. This initial magnetic pole estimating method repeats the estimation to find a correct initial magnetic pole position.

However, the prior art technique involves a repetition-based trial and error method which approaches from a wide estimation error range to a narrower estimation error range of the initial magnetic pole position to estimate a true value for the initial magnetic pole position of an AC synchronous motor, and experiences the following problems:

(1) a correct initial magnetic pole position cannot be estimated (a magnetic pole position estimation accuracy range is within ±30°);

(2) a motor operation range can become wider during an estimation of an initial magnetic pole position;

(3) an estimation time can be long; and (4) an application to a load is difficult if disturbance such as a large static friction, cogging and the like exists in the load.

To solve the foregoing problems, it is an object of the present invention to make full use of the performance and characteristics of an AC synchronous motor by:

(1) the ability to estimate a magnetic pole position in a short time;

(2) the ability to freely set a range in which the motor can operate;

(3) the ability to minimize a range in which the motor can operate;

(4) the applicability to a load even if disturbance or large cogging torque exists in the load; and (5) the ability to correctly estimate a true value for an initial magnetic pole position.

DISCLOSURE OF THE INVENTION

The gist of an initial magnetic pole estimating apparatus for an AC synchronous motor according to the present invention lies in the following (1)–(32).

(1) An initial magnetic pole estimating apparatus for an AC synchronous motor, equipped in an AC synchronous motor controller comprising speed control means for calculating a command torque (command current) from a command speed, current control means for driving the AC synchronous motor in accordance with the command torque (command current), and a PWM power converter, wherein the initial magnetic pole estimating apparatus is characterized by having speed deviation calculating means for subtracting the detected speed from the command speed generated by command speed pattern generating means to calculate a speed deviation, a speed gain control unit for multiplying the speed deviation by a speed gain to calculate a command torque (command current), mode section determining means for determining a mode section (a first cyclic section and a second cyclic section) from the command speed, a mode switch for switching a mode section to any of the first cyclic section and the second cyclic section in accordance with a result in the mode section determining means, data acquisition speed section determining means for determining whether the command speed is in a data acquisition speed section when the first cyclic section is selected, a first command torque calculating means (first command current calculating means) for calculating first command torque data (first command current data) from the command torque (the command current) in the determined data acquisition speed section, data acquisition speed section determining means for determining whether the command speed is in the data acquisition speed section when the second cyclic section is selected, second command torque calculating means (second command current calculating means) for calculating second command torque data (second command current data) from the command torque (the command current) in the determined data acquisition speed section, and estimated initial magnetic pole calculating means for calculating an estimated initial magnetic pole position using information on the first command torque data (the first command current data) and the second command torque data (the second command current data).

(2) An initial magnetic pole estimating apparatus for an AC synchronous motor equipped in an AC synchronous motor controller comprising PWM power converting means for converting a direct current voltage to an arbitrary alternate current voltage to drive the AC synchronous motor, three-phase current detecting means for detecting a three-phase current of the AC synchronous motor, an electric angle detecting means for detecting a relative electric angle of the AC synchronous motor, three-phase/two-phase coordinate conversion calculating means for performing a three-phase/two-phase coordinate conversion from a detected three-phase current to a detected two-phase current using the detected electric angle, detected speed calculating means for calculating a detected speed from the detected electric angle, two-phase current error calculating means for subtracting the detected two-phase current from a two-phase command current comprised of a q-axis command current and a d-axis command current to calculate a current error, a two-phase current proportion integration control unit for multiplying the current error by a two-phase current proportion integration gain to calculate a two-phase command voltage, two-phase/three-phase coordinate conversion calculating means for performing a two-phase/three-phase coordinate conversion from the two-phase command voltage to a three-phase command voltage using the detected electric angle, and PWM gate pulse calculating means for comparing the three-phase command voltage with a carrier waver to calculate a PWM gate pulse and outputting the PWM gate pulse to the PWM power converting means, wherein the initial magnetic pole estimating apparatus for an AC synchronous motor is characterized by having default initial magnetic pole setting means for setting a default initial magnetic pole position to zero, command speed pattern generating means for generating a command speed as a two-cycle waveform, speed deviation calculating means for subtracting the detected speed from the command speed to calculate a speed deviation, a speed gain control unit for multiplying the speed deviation by a speed gain to calculate a command torque (command current), mode section determining means for determining a mode section (a first cyclic section and a second cyclic section) from the command speed, a mode switch for switching a mode section to any of the first cyclic section and the second cyclic section in accordance with a result in the mode section determining means, acceleration section determining means for inputting the command torque (the command current) to the q-axis command current and inputting zero to the d-axis command current, when the first cyclic section is selected, and determining whether or not the command speed is in a positive acceleration section, first command torque calculating means (first command current calculating means) for calculating first maximum command torque data (first maximum command current data) from the command torque which is the determined positive acceleration section, first memory storing means for storing the first maximum command torque in a memory, acceleration section determining means for inputting zero to the q-axis command current and inputting the command torque (the command current) to the d-axis command current when the second cyclic section is selected, and determining whether or not the command speed is in a positive acceleration section, second command torque calculating means (second command current calculating means) for calculating second maximum command torque data (second maximum command current data) from the command torque which is in the determined positive acceleration section, second memory storing means for storing the second maximum command torque in a memory, estimated initial magnetic pole calculating means for calling the maximum command torques (first and second maximum command torques) from the memories after the command speed has terminated a second cycle to calculate an estimated initial magnetic pole position using the information, and compensated initial magnetic pole calculating means for adding the estimated initial magnetic pole position to the default initial magnetic pole position to calculate a compensated initial magnetic pole position.

(3) An initial magnetic pole estimating apparatus for an AC synchronous motor equipped in an AC synchronous motor controller comprising PWM power converting means for converting a direct current voltage to an arbitrary alternate current voltage to drive the AC synchronous motor, three-phase current detecting means for detecting a three-phase current of the AC synchronous motor, an electric angle detecting means for detecting a relative electric angle of the AC synchronous motor, detected speed calculating means for calculating a detected speed from the detected electric angle, three-phase command current calculating means for calculating three-phase command current comprised of a A-phase command current, a B-phase command current and a C-phase command current from a command torque (command current) using the detected electric angle, three-phase current error calculating means for subtracting the detected three-phase current from a three-phase command current to calculate a current error, a three-phase current proportion integration control unit for multiplying the current error by a three-phase current proportion integration gain to calculate a three-phase command voltage, and PWM gate pulse calculating means for comparing the three-phase command voltage with a carrier waver to calculate a PWM gate pulse and outputting the PWM gate pulse to the PWM power converting means, wherein the initial magnetic pole estimating apparatus for an AC synchronous motor is characterized by having default initial magnetic pole setting means for setting a default initial magnetic pole position to zero, command speed pattern generating means for generating a command speed as a two-cycle waveform, speed deviation calculating means for subtracting the detected speed from the command speed to calculate a speed deviation, a speed gain control unit for multiplying the speed deviation by a speed gain to calculate a command torque (command current), mode section determining means for determining a mode section (a first cyclic section and a second cyclic section) from the command speed, a mode switch for switching a mode section to any of the first cyclic section and the second cyclic section in accordance with a result in the mode section determining means, three-phase command current converting means operative when the first cyclic section is selected for adding a shift angle equal to zero degrees to the detected electric angle (without phase change), and calculating the three-phase command current from the command torque (the command current), acceleration section determining means for determining whether or not the command current is in a positive acceleration section, first command torque calculating means (first command current calculating means) for calculating a value of a first maximum command torque (first maximum command current) from the command torque which is in the determined positive acceleration section, first memory storing means for storing the first maximum command torque in a memory, the three-phase command current converting means operative when the second cyclic section is selected for adding a shift angle equal to 90 degrees to the detected electric angle (a phase change by 90 degrees), and thereafter calculating the three-phase command current from the command torque (the command current), acceleration section determining means for determining whether or not the command speed is in a positive acceleration section, second command torque calculating means (second command current calculating means) for calculating a value of a second maximum command torque (second maximum command current) from the command torque which is in the determined positive acceleration section, second memory storing means for storing the second maximum command torque in a memory, estimated initial magnetic pole calculating means for calling the maximum command torques (first and second maximum command torques) from the memories after the command speed has terminated a second cycle to calculate an estimated initial magnetic pole position using the information, and compensated initial magnetic pole calculating means for adding the estimated initial magnetic pole position to the default initial magnetic pole position to calculate a compensated initial magnetic pole position.

(4) An initial magnetic pole estimating apparatus for an AC synchronous motor according to any one of the foregoing (1)–(3), characterized in that the command speed pattern generating means is capable of arbitrarily setting an acceleration/deceleration section time and a constant speed section time, arbitrarily setting a speed waveform in the acceleration/deceleration section, and arbitrarily setting an amplitude value for a command speed to generate the command speed as a trapezoidal wave, a triangular waver, a rectangular wave, a zero-speed wave, a sinusoidal wave, and the like as a two-cycle waveform.

(5) An initial magnetic pole estimating apparatus for an AC synchronous motor according to any one of the foregoing (1)–(4), characterized in that the speed gain control unit functions as a speed proportion control unit, a speed proportion integration control unit or a speed integration control unit in a combination of a speed proportion control unit and a speed integration control unit.

(6) An initial magnetic pole estimating apparatus for an AC synchronous motor according to any one of the foregoing (1)–(5), characterized in that the current control means is a dq current control means (vector current control means), or three-phase current control means.

(7) An initial magnetic pole estimating apparatus for an AC synchronous motor according to any one of the foregoing (1)–(6), characterized in that in the dq current control means used as the current control means, the command current is inputted to the q-axis command current, and a constant value is inputted to the d-axis command current in the first cyclic section, and the command current is inputted to the d-axis command current, and a constant value is inputted to the q-axis command current in the second cyclic section.

(8) An initial magnetic pole estimating apparatus for an AC synchronous motor according to any one of the foregoing (1)–(7), characterized in that the constant value is an arbitrary number.

(9) An initial magnetic pole estimating apparatus for an AC synchronous motor according to any one of the foregoing (1)–(8), characterized in that in the three-phase current control means used as the current control means, in the first cyclic section, after a shift angle equal to zero degrees is added to the detected electric angle (without phase change), the command torque (the command current) is converted to a three-phase command current as shown in the following equations, and in the second cyclic section, after a shift angle equal to 90 degrees is added to the detected electric angle (phase change by 90 degrees), the command torque (the command current) is converted to a three-phase command current as shown in the following equations.

$$Ia^*=I^*\times\cos(\theta fb-\theta shift)$$

$$Ib^*=I^*\times\cos(\theta fb-\theta shift-120 \text{ degrees})$$

$$Ic^*=I^*\times\cos(\theta fb-\theta shift-240 \text{ degrees})$$

where $I^*$ is a command torque (command current);
 $\theta fb$ is a detected electric angle (relative position);
 $\theta shift$ is a shift angle (zero degrees in the first cyclic section, and 90 degrees in the second cyclic section);
 $Ia^*$ is an A-phase command current;
 $Ib^*$ is a B-phase command current; and
 $Ic^*$ is a C-phase command current.

(10) An initial magnetic pole estimating apparatus for an AC synchronous motor according to any one of the foregoing (1)–(9), characterized in that in the current control means, the command torque (the command current) is treated as the command current in the first cyclic section after a shift angle equal to zero degrees is added to the detected electric angle (without phase change), and the command torque (the command current) is treated as the command current in the second cyclic section after a shift angle equal to 90 degrees is added to the detected electric angle (phase change by 90 degrees).

(11) An initial magnetic pole estimating apparatus for an AC synchronous motor according to any one of the foregoing (1)–(10), characterized in that the data acquisition speed section is comprised of a combination of a positive acceleration section, a negative acceleration section, a positive deceleration section, a negative deceleration section, a positive constant speed section, and a negative constant speed section.

(12) An initial magnetic pole estimating apparatus for an AC synchronous motor according to any one of the foregoing (1)–(11), characterized in that the data acquisition speed section determining means is acceleration section determining means when the magnetic pole estimating data is acquired in an acceleration section; constant speed section determining means when acquired in a constant speed section; acceleration/constant speed section determining means when acquired in an acceleration section and a constant speed section; deceleration/constant speed section determining means when acquired in a deceleration section and a constant speed section; acceleration/deceleration determining means when acquired in an acceleration section and a deceleration section; and an acceleration/deceleration/constant speed section determining means when acquired in an acceleration section, a deceleration section and a constant speed section.

(13) An initial magnetic pole estimating apparatus for an AC synchronous motor according to any one of the foregoing (1)–(12), characterized in that when the data acquisition speed section determining means is the constant speed section determining means, the magnetic pole estimating data is calculated after the arbitrary time set due to the fact that it can be set from zero to an arbitrary time (however, the arbitrary time is smaller than an end time of the constant speed section) until the end time of the constant speed section.

(14) An initial magnetic pole estimating apparatus for an AC synchronous motor according to any one of the foregoing (1)–(13), characterized by having first memory storing means for storing the first command current data calculated in the first cyclic section in a memory, and second memory storing means for storing the second command current data calculated in the second cyclic section in a memory.

(15) An initial magnetic pole estimating apparatus for an AC synchronous motor according to any one of the foregoing (1)–(14), characterized by calling the command torque data (first and second command torque data) from the memory.

(16) An initial magnetic pole estimating apparatus for an AC synchronous motor according to any one of the foregoing (1)–(15), characterized in that the estimated initial magnetic pole position is calculated as expressed by $\tan^{-1}$ (the first command current data/the second command current data), or a combination of $\cos^{-1}$ and $\sin^{-1}$, or the estimated initial magnetic pole position is calculated as expressed by $\Sigma(\tan^{-1}$ (the first instantaneous command current data/the second instantaneous command current data) )/k when the first and second command current data are instantaneous command currents, or calculated from a relationship between the first command current data and the second command current data.

(17) An initial magnetic pole estimating apparatus for an AC synchronous motor according to any one of the foregoing (1)–(16), characterized in that the first command current data and second command current data calculated by the first command current calculating means and the second command current calculating means are a maximum command current, an average command current and an instantaneous command current, wherein the maximum command current is a maximum value calculated from a command current which is in the data acquisition speed section, the average command current is an average of the command current which is in the data acquisition speed section, and the instantaneous command current is a command current which is an instantaneously calculated command current which is in the data acquisition speed section.

(18) An initial magnetic pole estimating apparatus for an AC synchronous motor according to any one of the foregoing (1)–(17), characterized in that in the command speed, a pause section in which the command speed has a zero command speed is provided when switching between positive and negative, and a time for the pause section can be arbitrarily set.

(19) An initial magnetic pole estimating apparatus for an AC synchronous motor according to any one of the foregoing (1)–(18), characterized in that in the command speed, a pause section in which the command speed is zero is provided between a first cyclic section in a first cycle and a second cyclic section in a second cycle, and a section is switched during the pause section.

(20) An initial magnetic pole estimating apparatus for an AC synchronous motor according to any one of the foregoing (1)–(19), characterized in that the command current, a pause section is provided when a forced phase change is performed, and the phase change is performed in the pause section.

(21) An initial magnetic pole estimating apparatus for an AC synchronous motor according to any one of the foregoing (1)–(20), characterized by having speed integration gain processing means for performing speed integration gain processing (clearing, holding and the like of an integration term) of the speed gain control unit, when the first cyclic section is switched to the second cyclic section, or when a forced phase change is performed, in the command current.

(22) An initial magnetic pole estimating apparatus for an AC synchronous motor according to any one of the foregoing (1)–(21), characterized in that an axial direction determining command speed provided for determining a direction (region) of a torque axis or a magnetic flux axis of the AC synchronous motor uses a first cyclic waveform of the command speed according to the foregoing (4).

(23) An initial magnetic pole estimating apparatus for an AC synchronous motor according to any one of the foregoing (1)–(22), characterized in that a user sets one or more of a speed deviation limit level, a torque limit level, a speed limit level, and a data deviation limit level in a parameter setting memory within the initial magnetic pole estimating apparatus for an AC synchronous motor.

(24) An initial magnetic pole estimating apparatus for an AC synchronous motor according to any one of the foregoing (1)–(23), characterized in that excessive speed deviation determining means compares a speed deviation calculated by subtracting the detected speed from the axial direction determining command speed with the speed deviation limit level to determine an excessive speed deviation of the motor.

(25) An initial magnetic pole estimating apparatus for an AC synchronous motor according to any one of the foregoing (1)–(24), characterized in that excessive torque determining means compares a command torque supplied from the speed control unit with the torque limit level to determine an excessive command torque for the motor.

(26) An initial magnetic pole estimating apparatus for an AC synchronous motor according to any one of the foregoing (1)–(25), characterized in that excessive speed determining means compares the detected speed with the speed limit level to determine an excessive speed for the motor.

(27) An initial magnetic pole estimating apparatus for an AC synchronous motor according to any one of the foregoing (1)–(26), characterized by dividing 360 degrees of electric angle by a certain positive integer n, assuming that the torque axis exists in a certain direction within 360 degrees, controlling the AC synchronous motor with an axial direction determining command speed, determining an excessive speed deviation in the excessive speed deviation determining means, and estimating a direction of the torque axis from the determination result.

(28) An initial magnetic pole estimating apparatus for an AC synchronous motor according to any one of the foregoing (1)–(27), characterized by assuming that the torque axis of the AC synchronous motor is in another direction in accordance with the result of the excessive speed deviation determination, and estimating the direction of the torque axis of the AC synchronous motor by repeating the operation of controlling the AC synchronous motor with the axial direction determining command speed, and determining the excessive speed deviation in the excessive speed deviation determining means by a predefined subroutine.

(29) An initial magnetic pole estimating apparatus for an AC synchronous motor, characterized by estimating the direction of the torque axis of the AC synchronous motor in the axial direction determining means according to any one of the foregoing (22)–(28), and thereafter estimating an initial magnetic pole position of the AC synchronous motor in the calculation processing according to the foregoing (1), (2) or (3).

(30) An initial magnetic pole estimating apparatus for an AC synchronous motor according to any one of the foregoing (1)–(29), characterized in that excessive data deviation determining means compares a difference between the first command torque data and the second command torque data (data difference) with the data deviation limit level to determine an excessive data deviation.

(31) An initial magnetic pole estimating apparatus for an AC synchronous motor according to any one of the foregoing (1)–(30), characterized by determining an excessive data deviation in the excessive data deviation determining means, and estimating an initial magnetic pole position of the AC synchronous motor again by the calculation processing according to the foregoing (1), (2) or (3) after changing to a predefined phase, when the determination result shows "data deviation≧data deviation limit level."

(32) An initial magnetic pole estimating apparatus for an AC synchronous motor according to any one of the foregoing (1)–(31), characterized in that the AC synchronous motor is a rotary motor or a linear motor.

Figure 1:
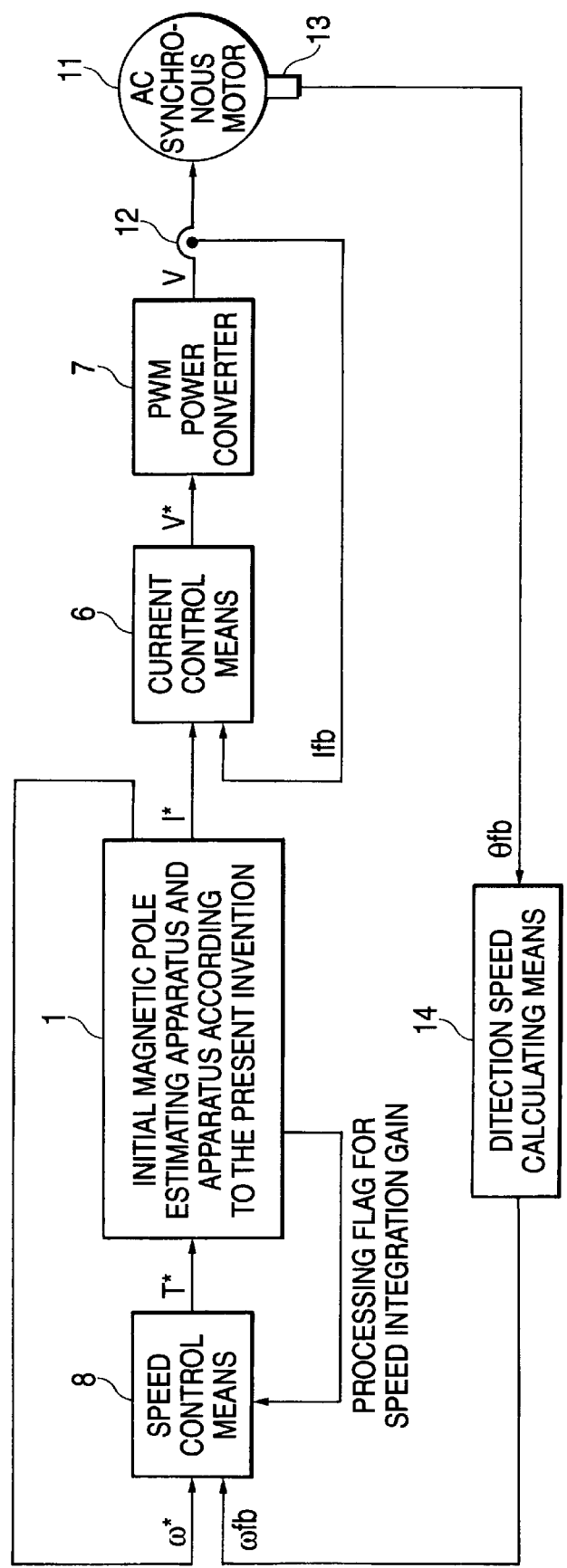
FIG. 1 is a general block diagram of a speed control including an initial magnetic pole estimating apparatus directed by the present invention.

In the drawings, * is a suffix indicative of a command; fb is a suffix indicative of detection; d-q indicates a two-phase coordinate system; a-b-c indicates a three-phase coordinate system; Vt indicates a carrier triangular wave voltage; Vdc indicates a direct current voltage of a PWM invertor; Vq*, Vd* indicate command voltages for a d-axis and a q-axis in the two-phase coordinates; Va*, Vb*, Vc* indicate command voltages in an a-phase, a b-phase and a c-phase in the three-phase coordinate system; Va, Vb, Vc indicate output voltages of an invertor in the a-phase, b-phase and c-phase in the three-phase coordinates; T* indicates a command torque; I* indicates a command current; Tm, T, Tloss indicates a maximum torque value, a generated torque (thrust force) and a torque loss; Iq*, Id* indicate command currents fr the q-axis and d-axis in the two-phase coordinates; Ia, Ib, Ic are actual currents in the a-phase, b-phase, c-phase in the three-phase coordinates; Iafb, Ibfb, Icfb are detected currents in the a-phase, b-phase, c-phase in the three-phase coordinates; ΔIq, ΔId indicate current errors on the q-axis and d-axis in the two-phase coordinates; I1data*, I2data* indicate first command current data and second command current data; I1data*call, I2data*call indicate call first command current data and call second command current data; I1max*, I2max* indicate a first maximum command current and a second maximum command current; I1ave*, I2ave* indicate a first average command current and a second average command current; I1inst*[k], I2inst*[k] indicate a first instantaneous command current at time k and a second instantaneous command current at time k; θerror indicates an offset angle of an initial magnetic pole position; θ0 indicates a default initial magnetic pole position at an initial setting; θest, θcomp indicate an estimated initial magnetic pole position and a compensated initial magnetic pole position; θestmax, θestave, θestinst indicate an estimated initial magnetic pole position calculated using a maximum command current, an estimated initial magnetic pole position calculated using an average command current, and an estimated initial magnetic pole position calculated using an instantaneous command current; ω*, ωfb indicate a command speed and a detected speed; Δω indicates a speed deviation; MAX indicates a maximum value calculating function; FNC is an arbitrary function; ABS is an absolute value calculating function; Gau, Gbu, Gcu, Gad, Gbd, Gcd indicate pulses of a gate 6 in a PWM invertor; sp_err indicates a speed deviation determination flag; safe_area indicates an axial direction determination flag.

Reference numeral 1 designates an initial magnetic pole estimating apparatus and method according to the present invention; 6 a current control means; 7 a PWM power converter; 8 a speed control means; 11 an AC synchronous motor (a rotary motor or a linear motor); 12 a three-phase alternate current detector (CT); 13 an encoder; 14 a detected speed calculating means; 15 a compensated initial magnetic pole position calculating means; 61 a 3/2 coordinate conversion calculating means; 62 a subtractor (current error calculating means); 63 a current proportional integral control unit; 64 a 2/3 coordinates conversion calculating means; 71 a PWM gate pulse generator; 72 a triangular carrier wave; 73 a PWM invertor; 74 a direct current power supply; 81 a subtractor (speed deviation calculating means); 82 a speed gain control means; 101 a command speed pattern generating means; 102 a mode section determining means; 103 a speed integration gain processing means; 104 a mode switch; 1101 a first cyclic section (q-axis command current←command torque, d-axis command current←0); 1102 a data acquisition speed section determining means; 1103 a first command current calculating means; 1104 a first memory storing means; 1201 a second cyclic section (q-axis command current←0, d-axis command current←command torque); 1202 a data acquisition speed section determining means; 1203 a second command current calculating means; 1204 a second memory storing means; 105 a command speed end determining means; 106 a memory calling means; 106A an excessive data deviation determining means; 107 an estimated initial magnetic pole position calculating means; 108 a default initial magnetic pole position setting means; and 109 a compensated initial magnetic pole position calculating means.

BEST MODE FOR CARRYING OUT THE INVENTION

In the following, an embodiment of the present invention will be described with reference to the drawings.

FIG. 1 is a general block diagram of a speed control including an initial magnetic pole estimating apparatus directed by the present invention.

In FIG. 1, an AC motor 11 is driven by a current control means 6 and a PWM power converter 7 in accordance with a command torque. The AC synchronous motor 11 is an AC rotary motor or an AC linear motor which does not have a magnetic pole sensor (pole sensor).

A current detecting means 12 detects a current Ifb of the AC motor 11, and an electric angle detecting means (encoder) 13 detects a relative electric angle (relative position) □fb of the AC motor.

A detected speed calculating means 14 calculates a detected speed □fb from the detected electric angle □fb detected by the electric angle detecting means 13.

The initial magnetic pole estimating apparatus and method 1 according to the present invention generate a command speed, calculates a command torque in a speed control means 8 from information on the command speed and a detected speed, and performs processing in accordance with the initial magnetic pole estimating apparatus and method of the present invention from information on the command torque to find an estimated initial magnetic pole position for an AC synchronous motor.

Figure 2:
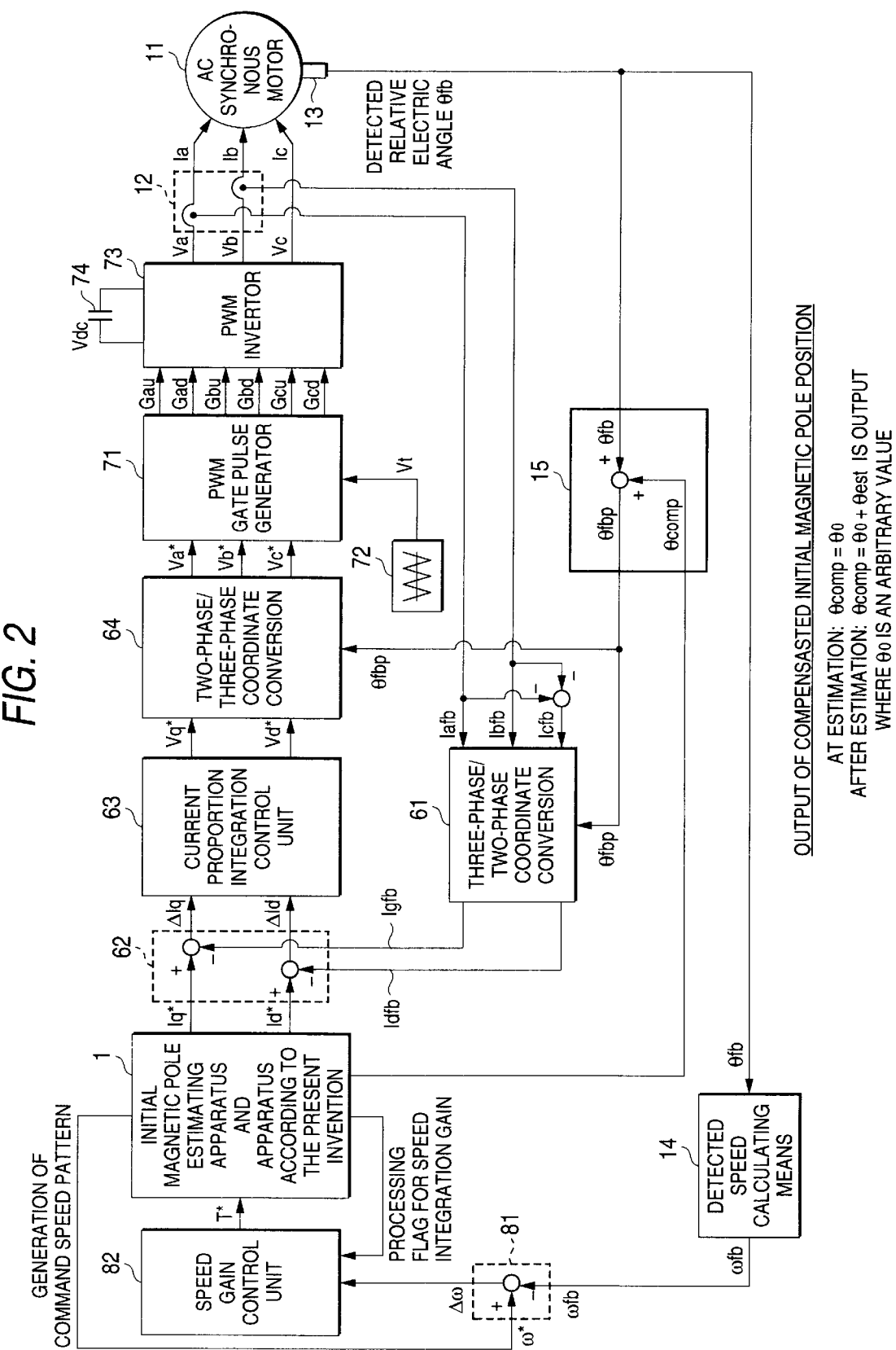
FIG. 2 is a block diagram of a speed control based on a dq current control (vector control) including an initial magnetic pole estimation method for an AC synchronous motor according to an embodiment of the present invention.

FIG. 2 is a block diagram of a speed control based on a dq current control (vector control) including an initial magnetic pole method for an AC synchronous motor according to an embodiment of the present invention.

Figure 3:
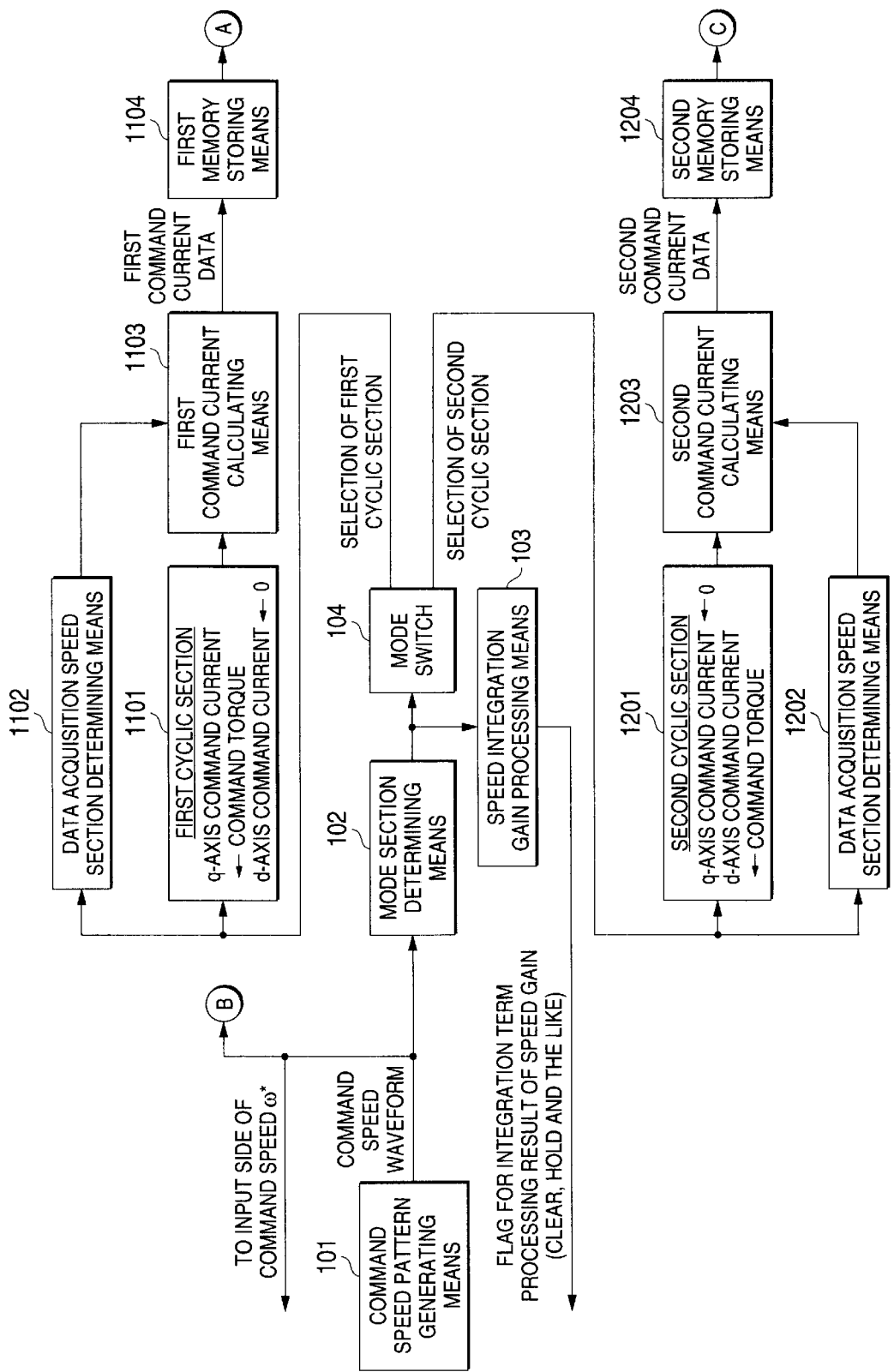
FIG. 3 is a detailed block diagram related to the initial magnetic pole estimating method for an AC synchronous motor according to the embodiment of the present invention.
Figure 4:
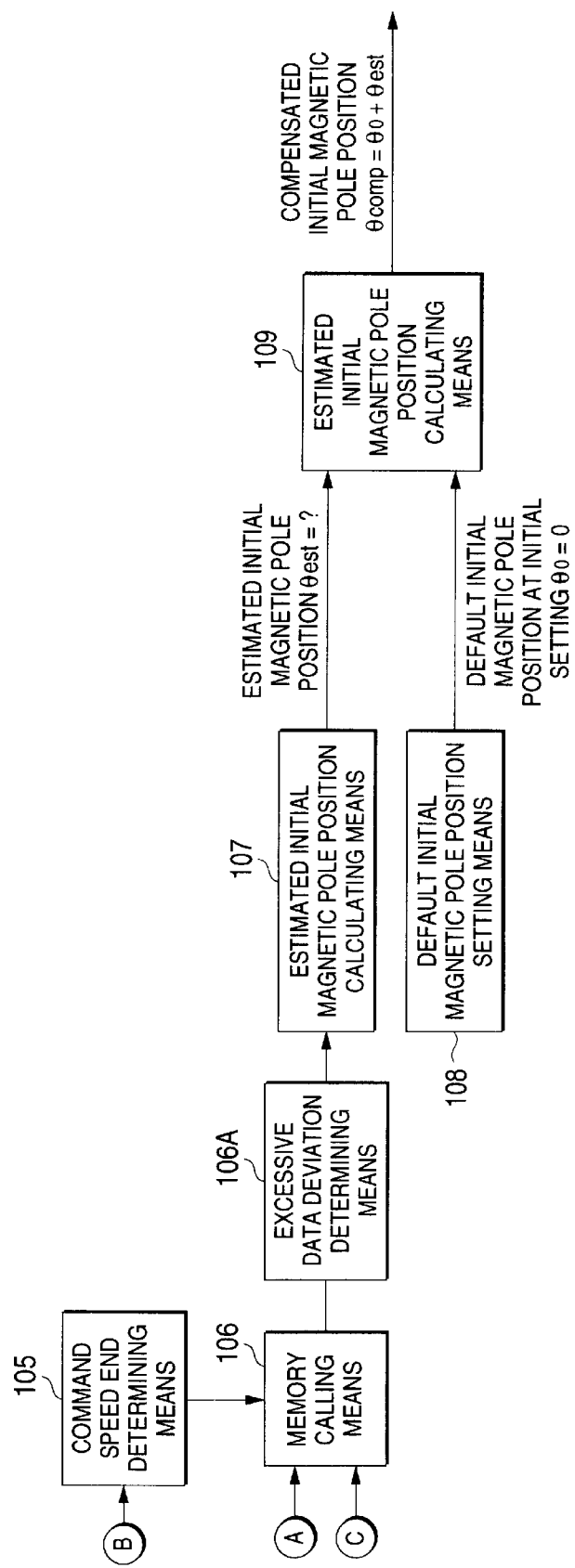
FIG. 4 is a detailed block diagram related to the initial magnetic pole estimating method for an AC synchronous motor according to the embodiment of the present invention.

FIGS. 3–4 are detailed block diagrams related to the initial magnetic pole estimating method for an AC synchronous motor according to the embodiment of the present invention.

Figure 5:
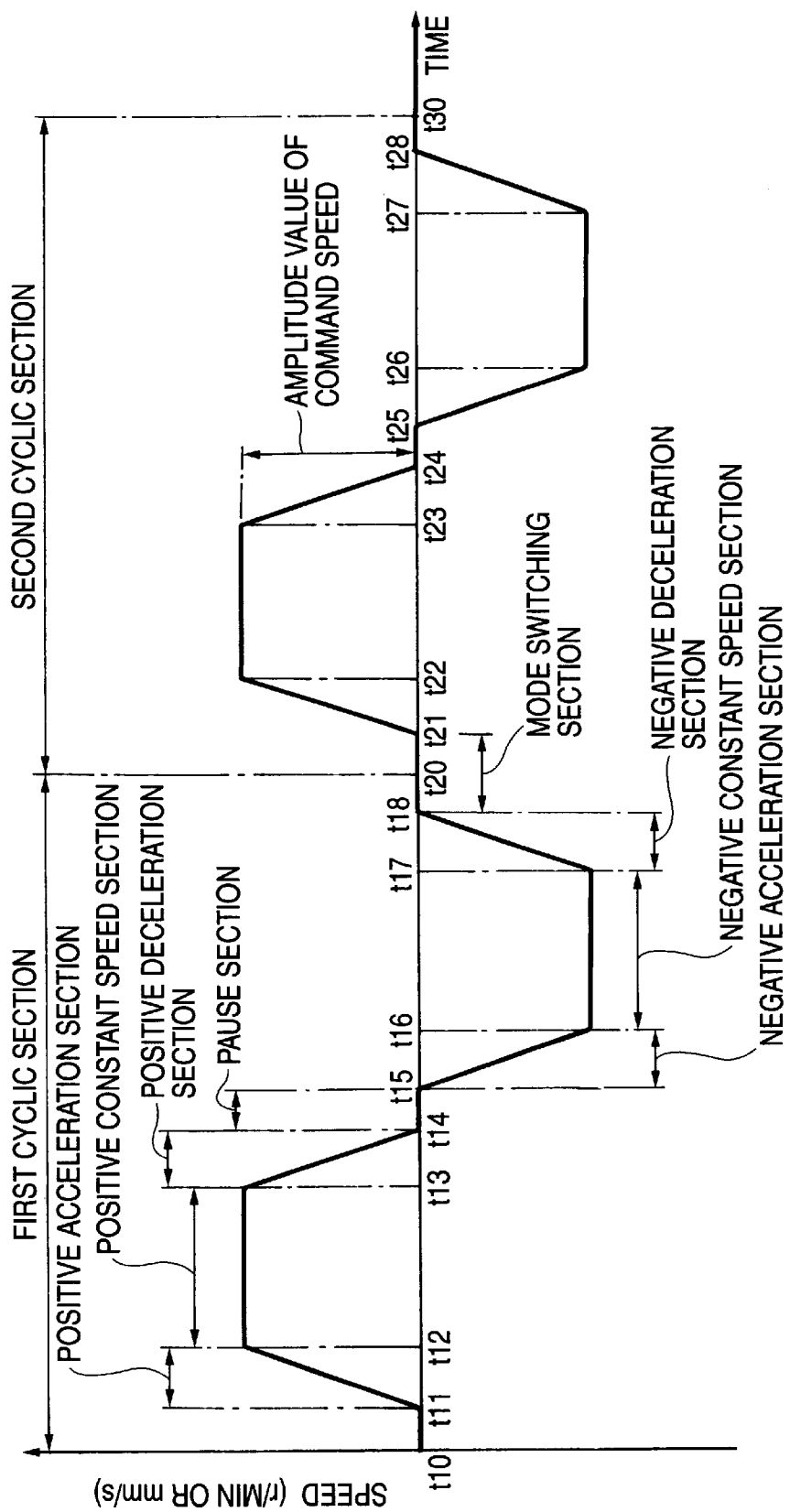
FIG. 5 is a diagram related to a command speed pattern (trapezoidal wave) having a command speed over two cycles according to the embodiment of the present invention.
Figure 6:
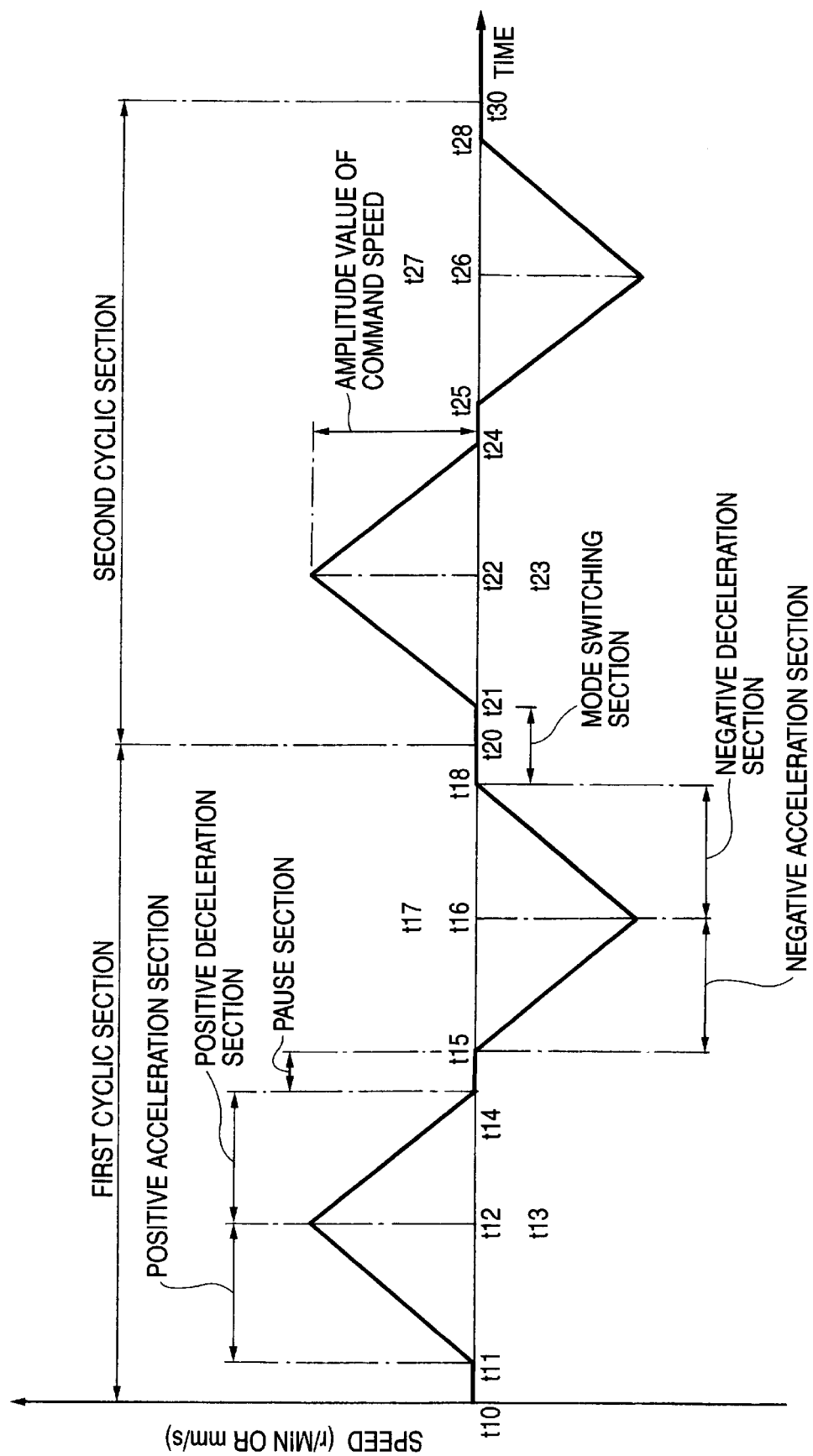
FIG. 6 is a diagram related to a command speed pattern (triangular wave) having a command speed over two cycles according to the embodiment of the present invention.
Figure 7:
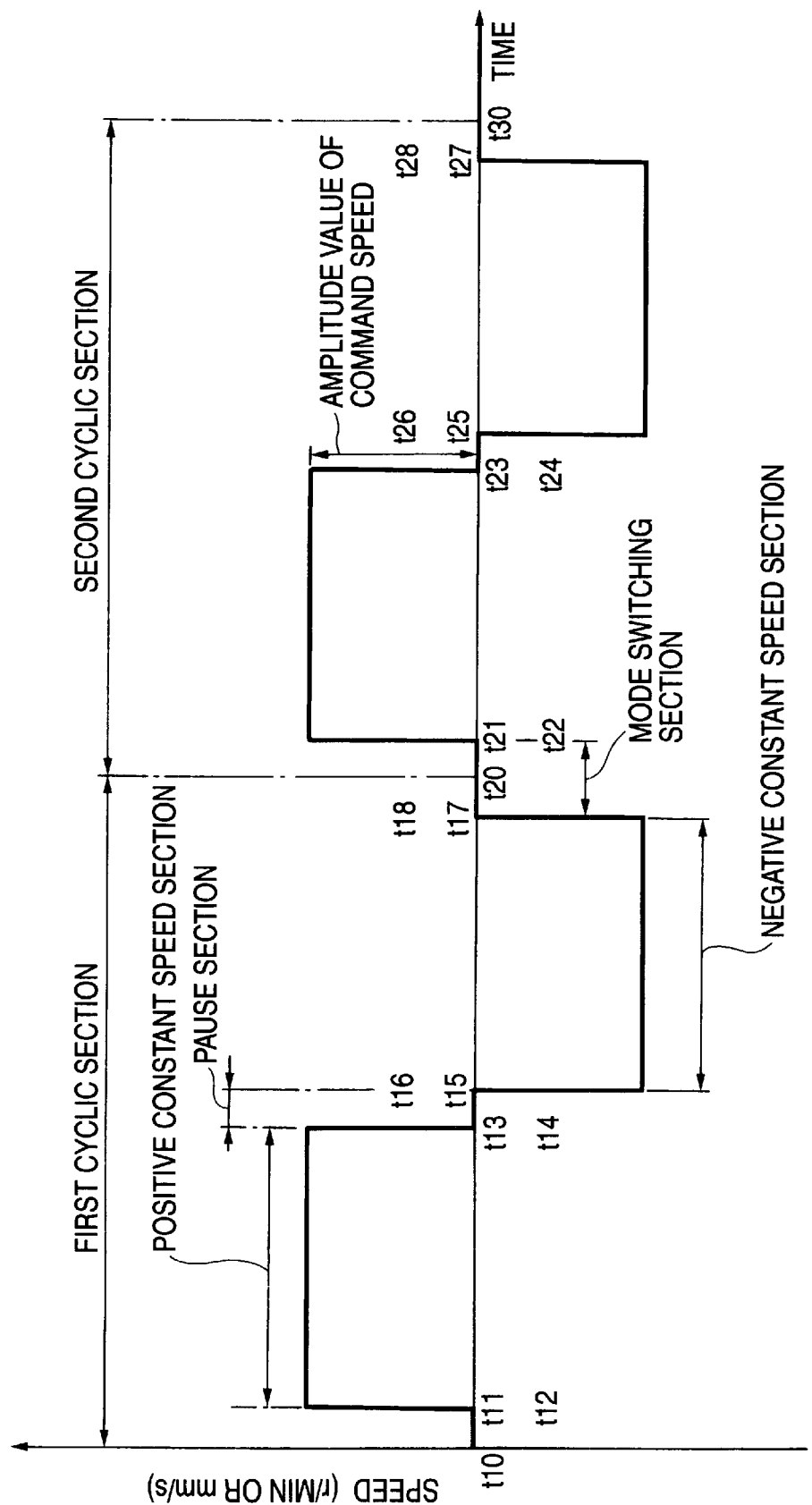
FIG. 7 is a diagram related to a command speed pattern (rectangular wave) having a command speed over two cycles according to the embodiment of the present invention.
Figure 8:
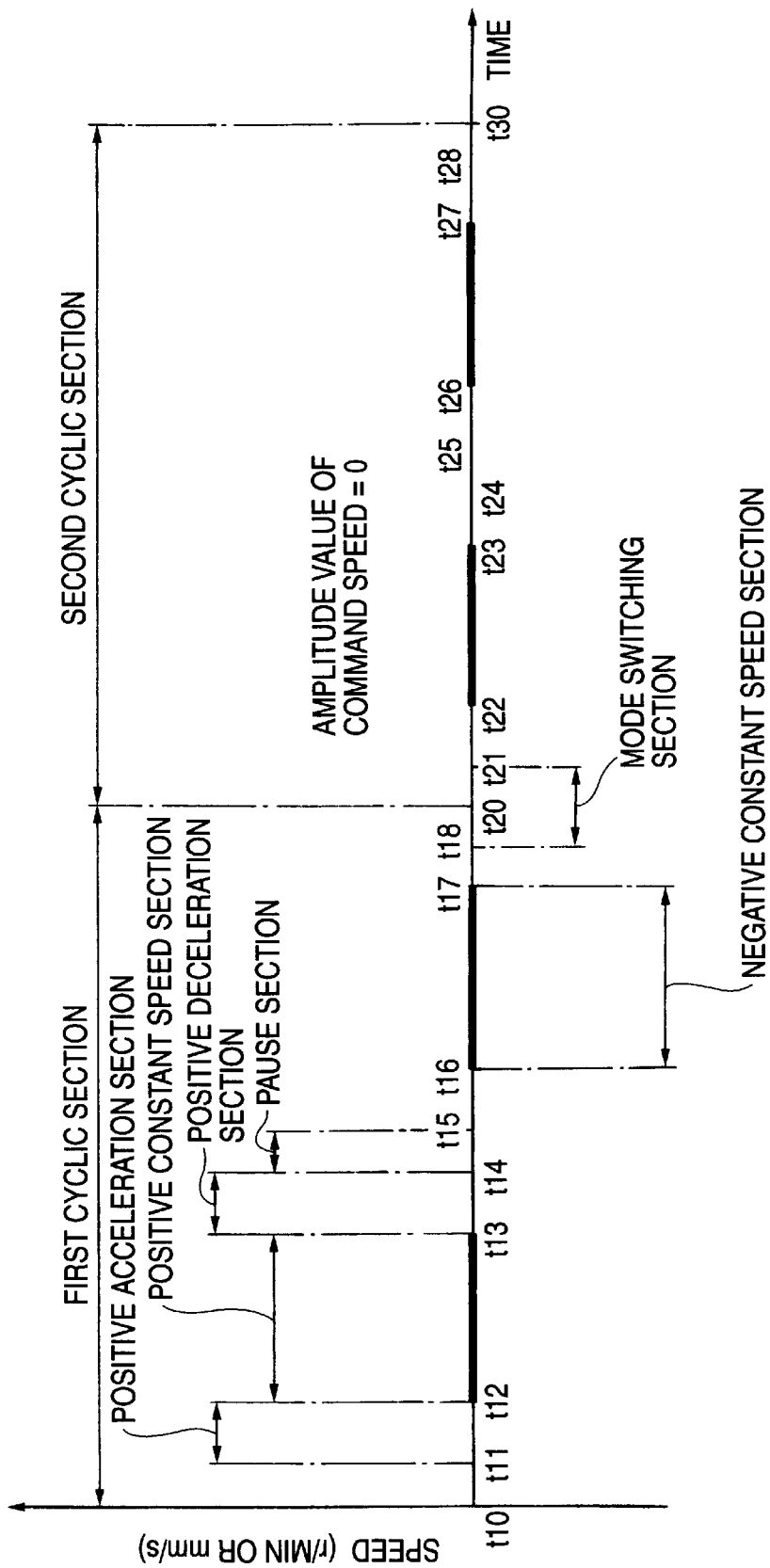
FIG. 8 is a diagram related to a command speed pattern (zero-speed wave) having a command speed over two cycles according to the embodiment of the present invention.

FIGS. 5–8 are diagrams related to command speed patterns having a waveform over two cycles according to the embodiment of the present invention, wherein FIG. 5 shows a command speed pattern of a trapezoidal wave; FIG. 6 shows a command speed pattern of a triangular wave; FIG. 7 shows a command speed pattern of a rectangular wave; and FIG. 8 shows a command speed pattern of a zero-speed wave. It should be noted that while a command speed increase/decrease pattern is arbitrary in an acceleration/deceleration section, a first-order increase/decrease function is used here for purposes of description.

Figure 9:
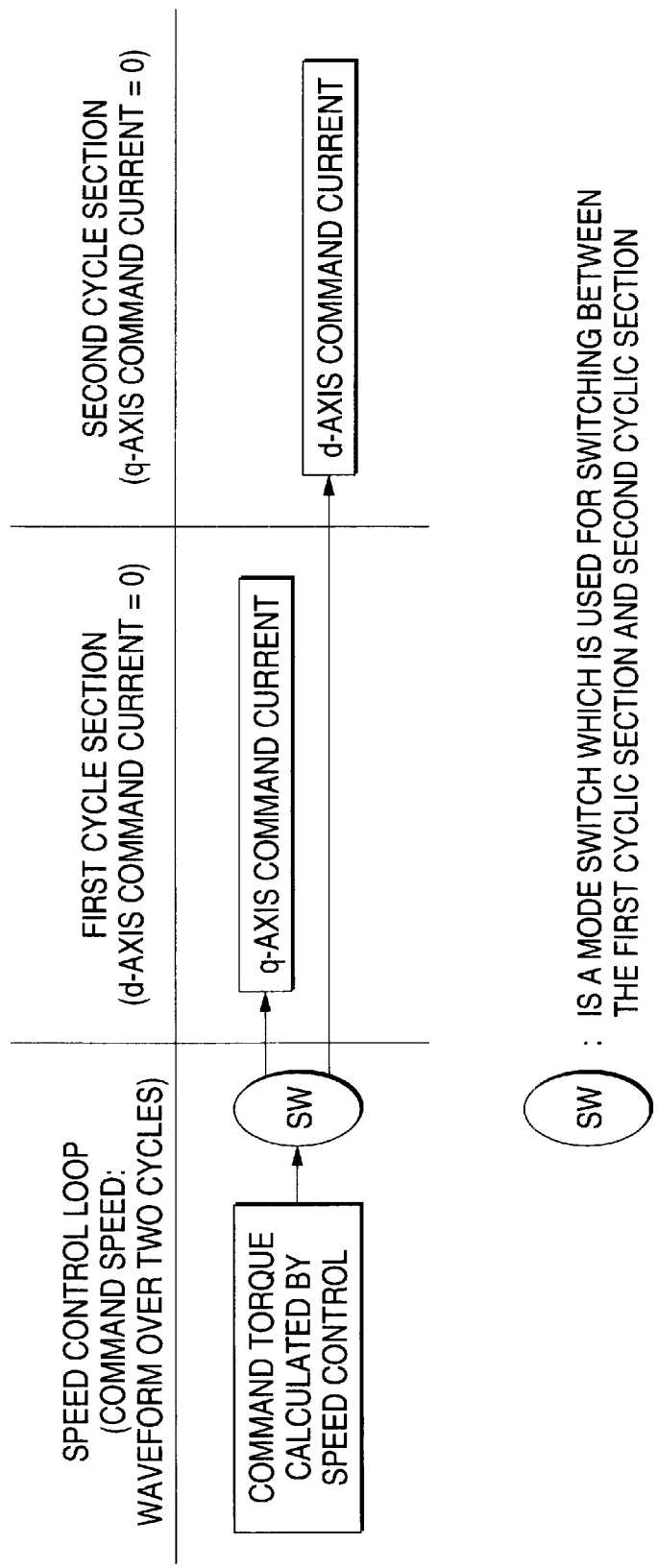
FIG. 9 is a diagram related to a dq mode switch in the detailed block diagram of the initial magnetic pole estimating method illustrated in FIG. 3.

FIG. 9 is a diagram related to a mode switch in the detailed block diagrams of the initial magnetic pole estimating method illustrated in FIGS. 3–4.

Figure 10:
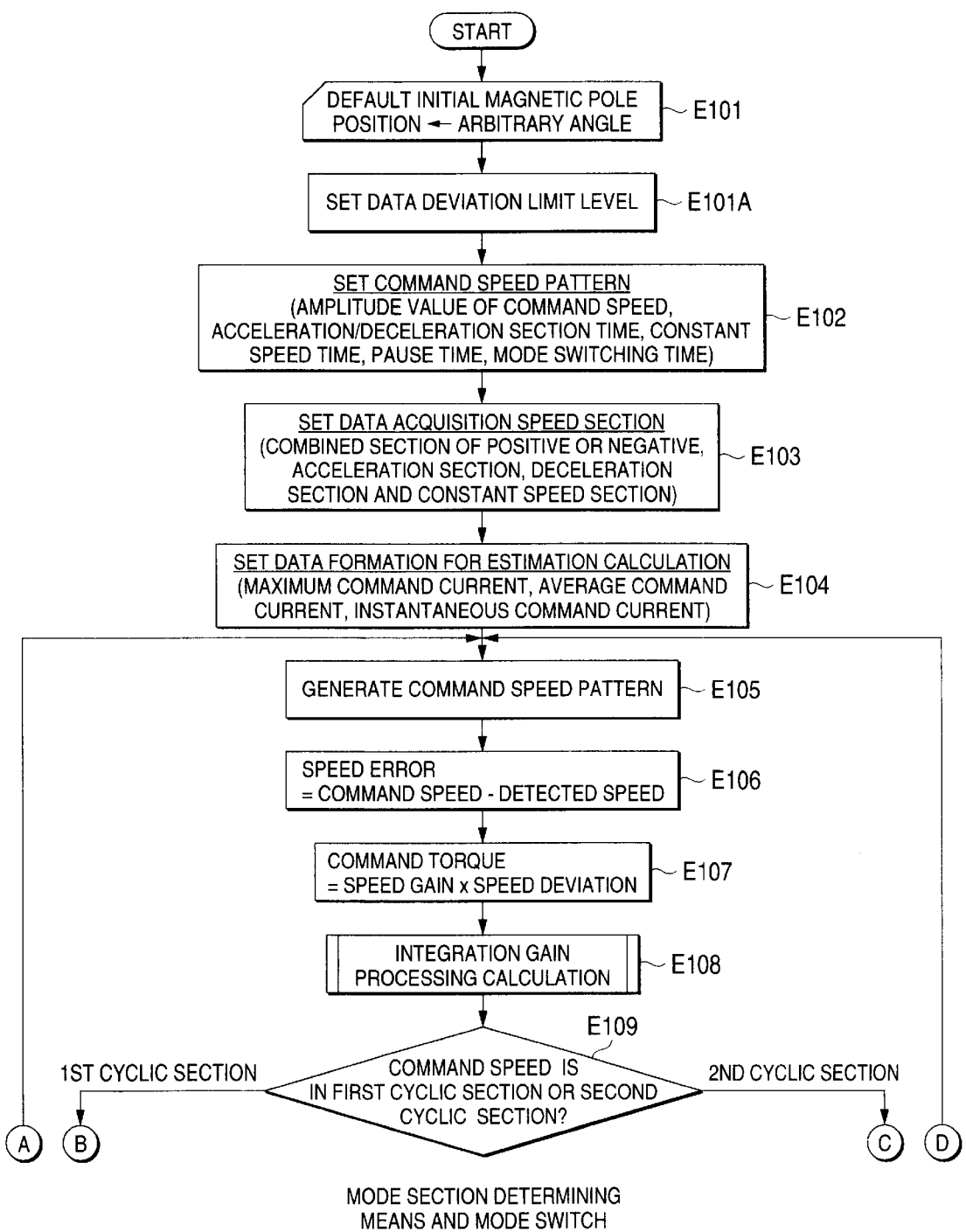
FIG. 10 is a flow chart related to the initial magnetic pole estimating method for an AC synchronous motor according to the embodiment of the present invention.
Figure 11:
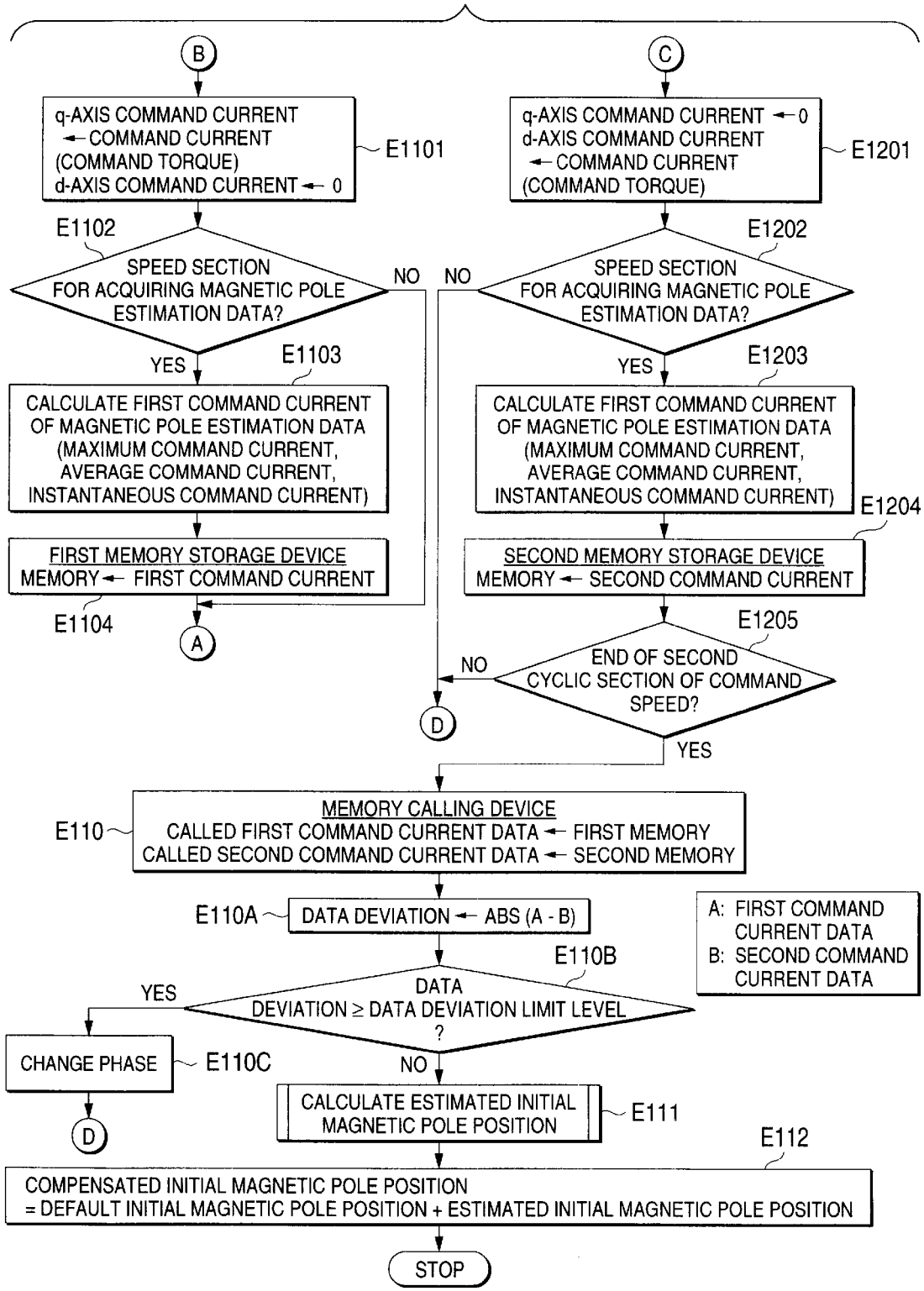
FIG. 11 is a flow chart related to the initial magnetic pole estimating method for an AC synchronous motor according to the embodiment of the present invention.

FIGS. 10–11 are flow charts related to the initial magnetic pole estimating method for an AC synchronous motor according to the embodiment of the present invention.

Sections for the command speed pattern over two cycles illustrated in FIGS. 5–8 are defined in the following manner.

(1) t10–t20 is a first cyclic section, and t20–t30 is a second cyclic section. These are shown in Table 1.

TABLE 1

| First Cyclic Section | Second Cyclic Section |
|---|---|
| t10–t20 | t20–t30 |

(2) t10–t11 is a zero speed start section; t14–t15 is a pause section; t18–t22 is a mode switching section; t24–t25 is a pause section; t28–t30 is a zero speed end section. The foregoing sections are zero speed sections (comprised of the zero speed start section, pause section, mode switching section, and zero speed end section), and these sections are also referred to as the pause section. These sections are shown in Table 2

TABLE 2

| Zero Speed Start Section | Pause Section | Mode Switching Section | Zero speed End Section |
|---|---|---|---|
| t10–t11 | t14–t15, t24–t25 | t18–t21 | t28–t30 |

(3) t11–t12, t13–t14, t15–t16, t17–t18, t21–t22, t23–t24, t25–t26, t27–t28 are acceleration/deceleration sections. These sections are shown in Table 3.

TABLE 3

| | Acceleration Section | Deceleration Section |
|---|---|---|
| Positive Direction | t11–t12, t21–t22 | t13–t14, t23–t24 |
| Negative Direction | t15–t16, t25–t26 | t17–t18, t27–t28 |

(4) t12–t13, t16 t17, t22–t23, t26–t27 are constant speed sections. These sections are shown in Table 4.

TABLE 4

| | Constant Speed Section |
|---|---|
| Positive Direction | t12–t13, t22–t23 |
| Negative Direction | t16–t17, t26–t27 |

In each of the sections defined above, a trapezoidal basic waveform (set time I)—applied waveforms (set time II—set time IV, and others) are contemplated by performing time settings for the sections in accordance with applications. These are shown in Table 5.

TABLE 5

| | Command Speed Pattern | | | |
|---|---|---|---|---|
| | Trapezoidal Wave FIG. 5 Set Time I | Triangular Wave FIG. 6 Set Time II | Rectangular Wave FIG. 7 Set Time III | Zero-Speed Wave FIG. 8 Set Time IV |
| Amplitude Value of Command Speed | 50 | 50 | 50 | 0 |
| Zero Speed Start Section Time | 5 ms | 5 ms | 5 ms | 5 ms |
| Zero Speed End Section Time | 5 ms | 5 ms | 5 ms | 5 ms |
| Acceleration Section Time | 50 ms | 50 ms | 0 ms | 50 ms |
| Deceleration Section Time | 50 ms | 50 ms | 0 ms | 50 ms |
| Constant Speed Section Time | 500 ms | 0 ms | 500 ms | 500 ms |
| Pause Section Time | 50 ms | 50 ms | 50 ms | 50 ms |
| Mode Switching Section Time | 50 ms | 50 ms | 50 ms | 50 ms |

Here, the times 5 ms, 50 ms, 500 ms are arbitrarily set values, and a command speed amplitude value of 50 is an arbitrarily set value, the unit of which is r/min (for a rotary motor) or mm/sec (for a linear motor).

The data acquisition speed section provided for acquiring data for a magnetic pole estimation can be selected from a variety of sections shown in FIG. 6 based on the command speed patterns defined above. These sections are shown in Table 6.

TABLE 6

(PART 1)

| Data Acquisition Speed Section | | Trapezoidal Wave | Triangular Wave | Rectangular Wave | Zero-Speed Wave |
|---|---|---|---|---|---|
| Positive Acceleration Section | t11–t12 t21–t22 | ○ | ○ | X | ○ |
| Negative Acceleration Section | t15–t16 t25–t26 | ○ | ○ | X | ○ |
| Positive Constant Speed Section | t12–t13 t22–t23 | ○ | X | ○ | ○ |
| Negative Constant Speed Section | t16–t17 t26–t27 | ○ | X | ○ | ○ |
| Positive Acceleration/ Constant Speed Section | t11–t13 t21–t23 | ○ | X | X | ○ |
| Negative Acceleration/ Constant Speed Section | t15–t17 t25–t27 | ○ | X | X | ○ |
| Positive Deceleration/ Constant Speed Section | t12–t14 t22–t24 | ○ | X | X | ○ |
| Negative Deceleration/ Constant Speed Section | t16–t18 t26–t28 | ○ | X | X | ○ |
| Positive Acceleration/ Deceleration Section | t11–t12 and t13–t14, t21–t22 and t23–t24 | ○ | ○ | X | ○ |

TABLE 6

(PART 2)

| Data Acquisition Speed Section | | Trapezoidal Wave | Triangular Wave | Rectangular Wave | Zero-Speed Wave |
|---|---|---|---|---|---|
| Negative Acceleration/ Deceleration Section | t15–t16 and t17–t18, t25–t26 and t27–t28 | ○ | ○ | X | ○ |
| Positive Acceleration/ Deceleration/ Constant Speed Section | t11–14, t21–t24 | ○ | X | X | ○ |
| Negative Acceleration/ Deceleration/ Constant Speed Section | t15–18, t25–t28 | ○ | X | X | ○ |

Here, ○ indicates that the data acquisition speed section an be set, and X indicates that the section cannot be set.

The type of data acquired for magnetic pole estimation in the data acquisition speed section can be set from the following three:

(1) First and Second Maximum Command Torques (First and Second Maximum Command Current);

(2) First and Second Average Command Torques (First and Second Average Command Current); and (3) First and Second Instantaneous Command Torques (First and Second Instantaneous Command Current).

The first command current and second command current can be selected from a maximum command torque, an average command torque and an instantaneous command torque in setting the type of data acquired for magnetic pole estimation, and calculations for acquiring the respective data are performed in accordance with the following equations (2)–(7):

$$I1max^* = MAC(I1^*[k]) \qquad (2)$$

$$I2max^* = MAC(I2^*[k]) \qquad (3)$$

$$I1ave^* = \Sigma(I1^*[k])/k \qquad (4)$$

$$I2ave^* = \Sigma(I2^*[k])/k \qquad (5)$$

$$I1inst^*[k] = I1^*[k] \qquad (6)$$

$$I2inst^*[k] = I2^*[k] \qquad (7)$$

where I1max* and I2max* are a first and a second maximum command current;

I1ave* and I2ave* are a first and a second average command current;

I1inst*[k] and I2inst*[k] are a first and a second instantaneous command current;

MAX is a function for calculating a maximum value; and k is an arbitrary number of data.

In the following, the initial magnetic pole estimating method according to the present invention will be described in an embodiment based on a dq current control and the following settings:

(1) Setting 1: Command Speed over Two Cycles→Command Speed Pattern of Trapezoidal Wave;

(2) Setting 2: Data Acquisition Speed Section→Positive Constant Speed Section; and (3) Setting 3: Data Acquired for Magnetic Pole Estimation→Maximum Command Torque (Maximum Command Current)

The embodiment of the present invention performs the initial magnetic pole estimating method illustrated in FIG. 3 in a speed control loop in a dq current control means for an AC synchronous motor illustrated in FIG. 2.

The dq current control for an AC synchronous motor comprises a configuration except for the AC synchronous motor 11 in FIG. 1. Specifically, the AC synchronous motor 11 is driven by a PWM power converting means 72 for converting a direct current voltage 74 into an arbitrary alternate current voltage, a three-phase current of the AC synchronous motor is detected by a three-phase current detector 12, a relative electric current of the AC synchronous motor is detected by an electric angle detector 13, a three-phase/two-phase coordinate conversion is performed by a three-phase/two-phase coordinate conversion calculating means 61 from the detected three-phase current to a detected two-phase current using information on the electric angle. A detection speed ω is calculated by a detected speed calculating means 14 using a detected electric angle θ. The detected two-phase current is subtracted from a two-phase command current to calculate a current error in a current error calculating means 62, the current error is multiplied by a two-phase proportional integral gain to calculate a two-phase command voltage in a two-phase current proportional integral control unit 63, and a two-phase/three-phase coordinate conversion is performed in a two-phase/three-phase coordinate conversion calculating means 64 from the two-phase command voltage to a three-phase command voltage using the information on the electric angle. The three-phase command voltage is compared with a triangular carrier waver 72 to calculate PWM gate pulses in a PWM gate pulse generating means 71, and these pulses are outputted to the PWM invertor 73.

As a next step, a trapezoidal command speed pattern is generated in a command speed pattern generating means 101, a detected speed is subtracted from the command speed to calculate a speed deviation in a speed deviation calculating means 81, and the speed deviation is multiplied by a speed gain to calculate a command torque (command current) in a speed gain control unit 82.

A mode section determining means 102 determines a mode section for a first cyclic section and a second cyclic section from the trapezoidal command speed, and a mode section switching operation is performed in a mode switch 104 in accordance with the determination result.

For switching from the first cyclic section to the second cyclic section (an operation in which a command current calculated by the speed control means is switched from an input to a q-axis command current to an input to a d-axis command current), the switching is performed without fail in a mode switching section which is a zero-speed section. This is because a defective operational phenomenon is more likely to occur due to a component accumulated by a speed integration gain (integration term) when the mode is switched in a section (for example, an acceleration/deceleration section, a constant speed section) other than the zero-speed section. Specifically, the mode is switched by the mode switch within t17–t20. Also, the integration term of the speed integration gain is cleared at an instance the mode is switched by the mode switch.

When the first cyclic section is selected, a command 1torque (command current) calculated in the speed gain control unit is inputted to a q-axis command current, while zero is inputted to a d-axis command current.

An acceleration section determining means 1102 determines whether or not a command speed is a positive acceleration section. A first maximum command torque (first maximum command current) is calculated from a certain command torque in the determined section, and stored in a memory by a first memory storing means 1104.

When the second cyclic section is selected, zero is inputted to the q-axis command current, and a command torque (command current) calculated in the speed gain control unit is inputted to the d-axis instruction current.

An acceleration section determining means 1202 determines whether or not a command speed is a positive acceleration section. A second maximum command torque (second maximum command current) is calculated from a certain command torque in the determined section, and stored in a memory by a second memory storing means 1204.

Subsequent to the second cyclic section (t30 -) of the command speed, the first maximum command current data and second maximum command current data stored in the memories are called from the memories by a memory calling means 106, and an excessive data deviation determining means 106A determines excessive data from the called first command current data and second command current data. Subsequently, an estimated initial magnetic pole position θest is calculated in an estimated initial magnetic pole calculating means 107 of Equation (8) from information on the called first command current data and second command current data. However, the first and second command current data (I1data*, I2data*), when stored in the memories, have the same values as the called first and second command current data (I1data*call, I2data*call).

(1) Routine I of Memory: I1data*→Memory→I2data*call;
(2) Routine II of Memory: I2data*→Memory→I2data*call.

$$\theta est = FNC(I1data^*, I2data^*) \qquad (8)$$
$$= \tan^{-1}(I1data^* / I2data^*)$$
$$= \tan^{-1}(\text{first maximum command current/ second maximum command current})$$

$$\text{maximum command current} \qquad (8)$$

where θest is an estimated initial magnetic pole position;
FNC is an arbitrary function;
I1data* is the first command current data (first command torque data); and
I2data* is the second command current data (second command torque data).

Finally, a compensated initial magnetic pole calculating means 109 using Equation (9) adds the estimated initial magnetic pole position θest to a default initial magnetic pole position θ0 set by a default initial magnetic pole position setting means 108 to calculate a compensated initial magnetic pole position θcomp:

$$\theta comp=\theta0+\theta est \qquad (9)$$

where θcomp is the compensated initial magnetic pole position; and
θ0 is the default initial magnetic pole position (arbitrary value) in the initial settings.

When the first command current data and second command current data used in the calculation of the estimated initial magnetic pole position are a maximum command current, an average command current, and an instantaneous command current, the estimated initial magnetic pole position θest (θestmax, θestave, θestinst) is calculated by the following Equations (10)–(12):

$$\theta estmax=\tan^{-1}(I1max^*/I2max^*) \qquad (10)$$
$$\theta estave=\tan^{-1}(I1ave^*/I2ave^*) \qquad (11)$$
$$\theta estinst=\Sigma(\tan^{-1}(I1inst^*[k]/I2inst^*[k]))/k \qquad (12)$$

Figure 12:
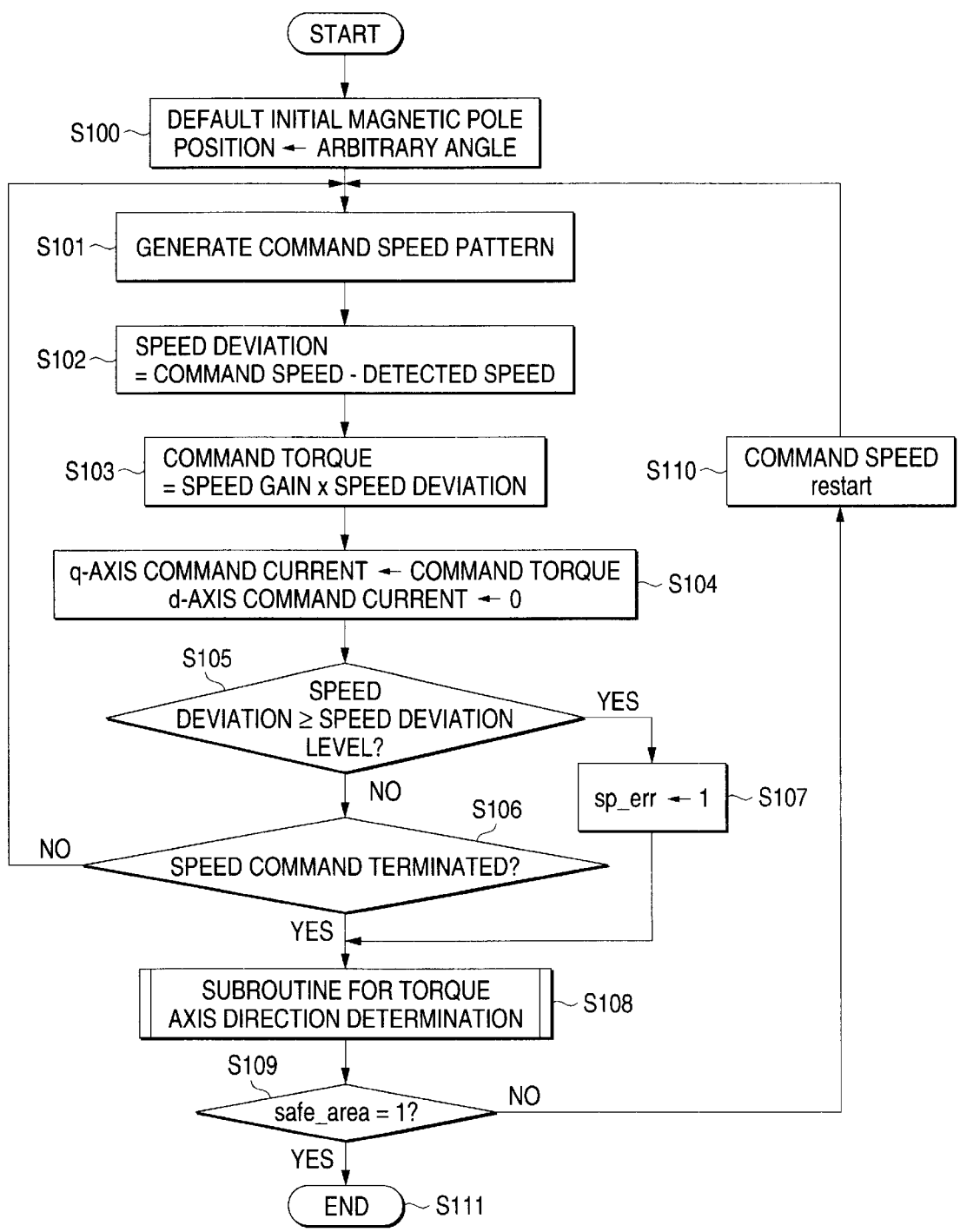
FIG. 12 is a flow chart for determining a region of a torque axis or a magnetic flux axis according to the embodiment of the present invention.

FIG. 12 is a flow chart for determining a region of a torque axis or a magnetic flux axis in accordance with the embodiment of the present invention.

Figure 13:
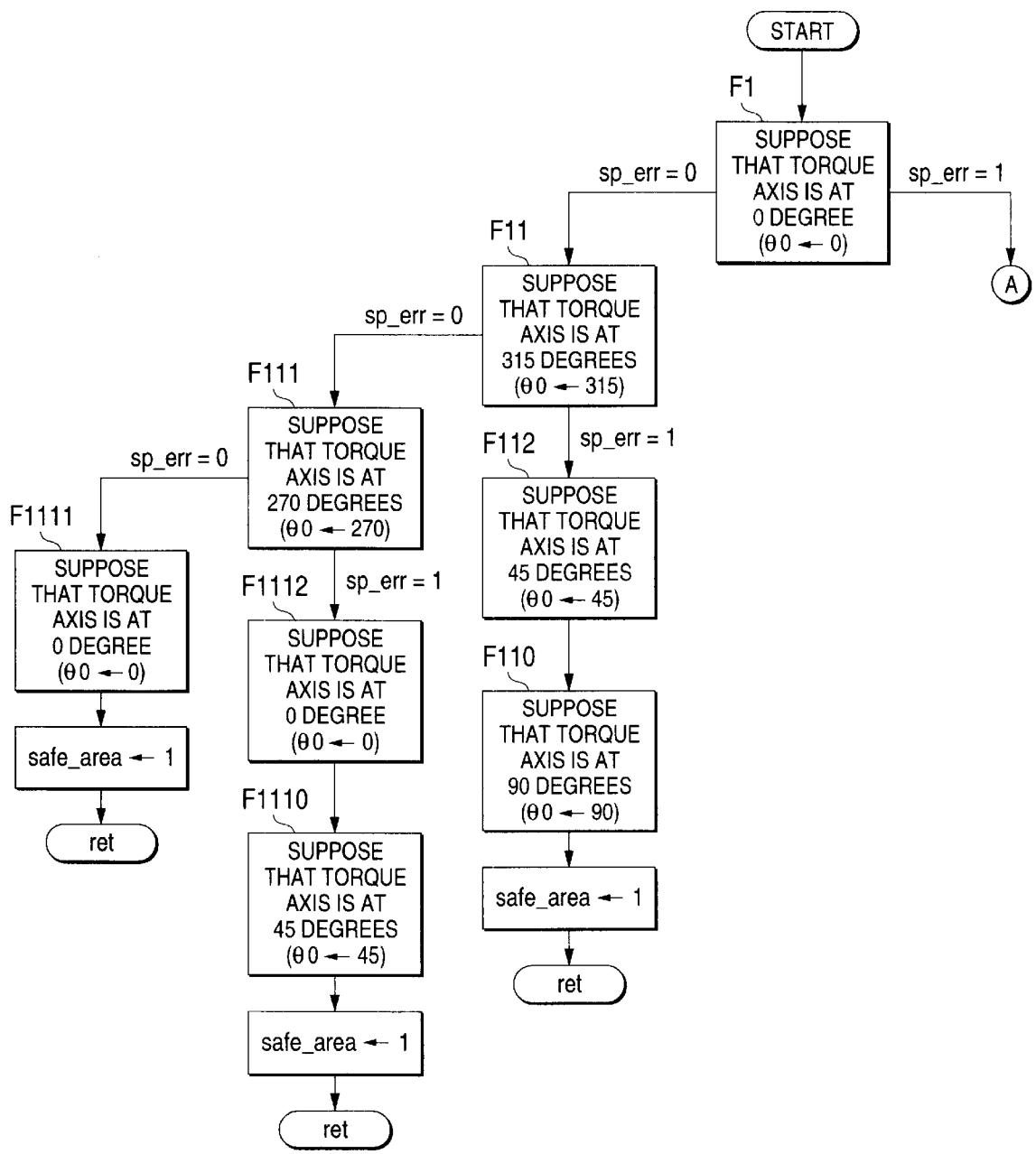
FIG. 13 is a flow chart related to a "subroutine for determining the direction of the torque axis" at 108 in the flow chart of FIG. 12.

FIG. 13 is a flow chart related to a "subroutine for determining the direction of the torque axis" at S108 in the flow chart of FIG. 12.

Figure 14:
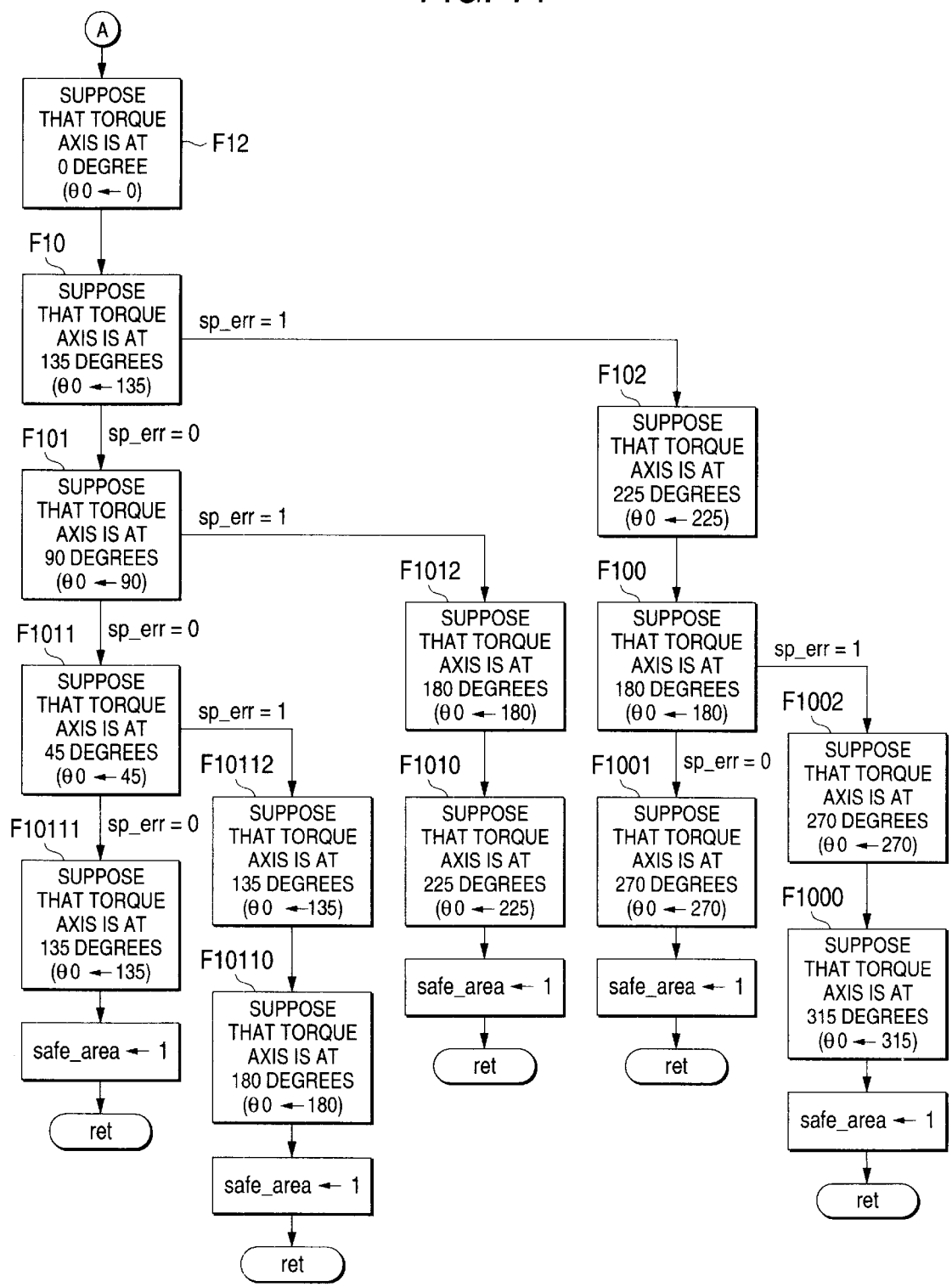
FIG. 14 is a flow chart continued from a position (A) in the flow chart of FIG. 13.

FIG. 14 is a flow chart continued from a position (A) in the flow chart of FIG. 13.

Figure 15:
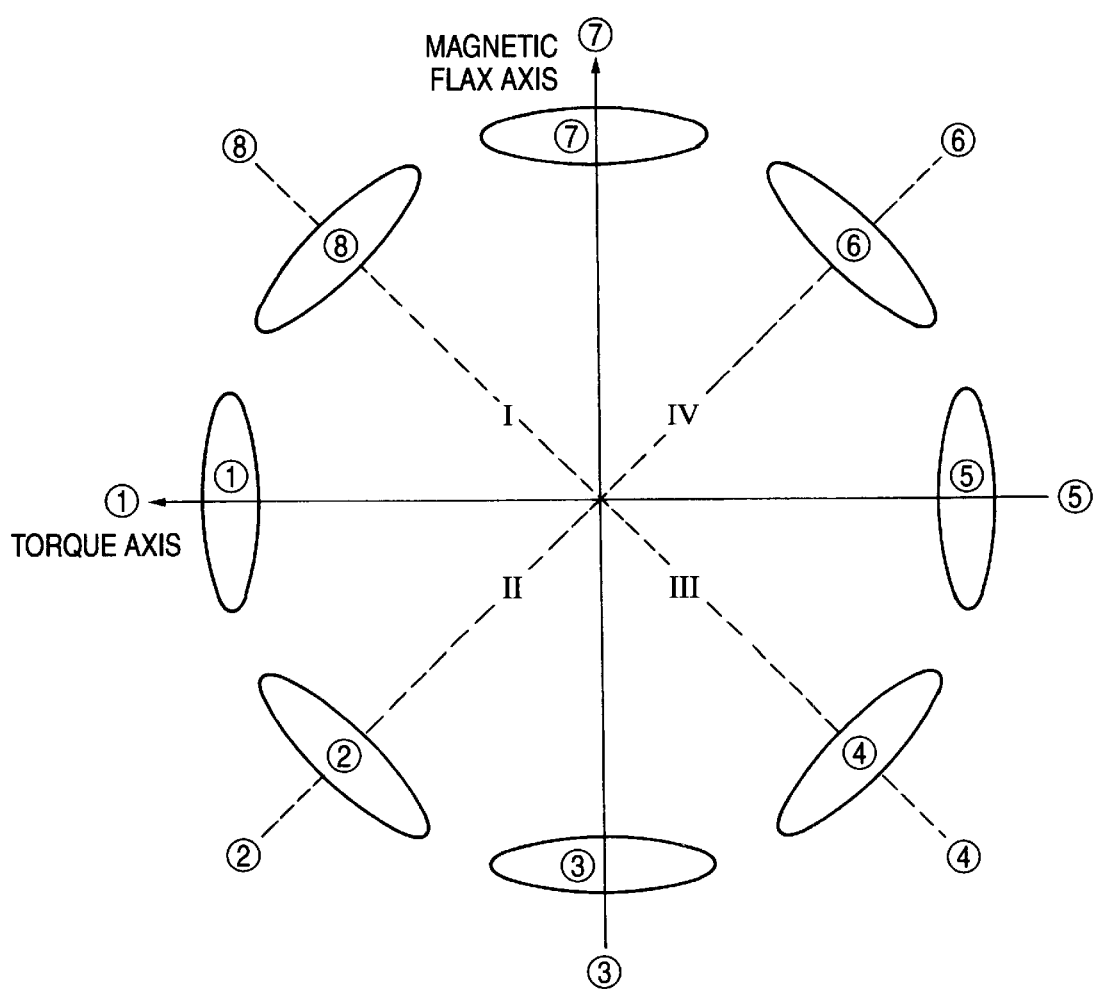
FIG. 15 is a diagram in which 360 degrees are divided into eight for representing respective directions in accordance with the embodiment of the present invention.
Figure 16:
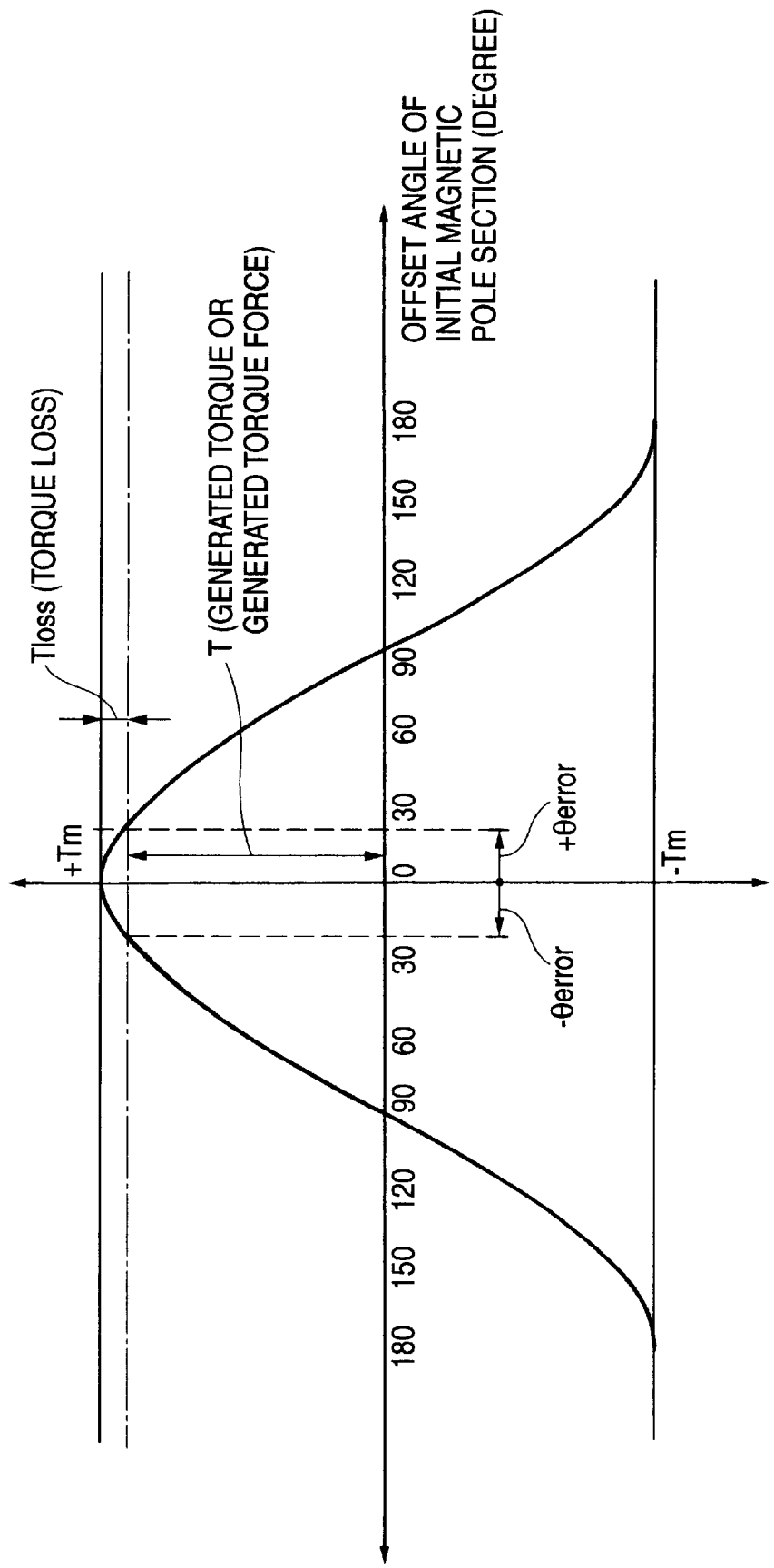
FIG. 16 is a diagram showing a relationship between an offset angle of an initial magnetic pole position and a generated torque.

FIG. 15 is a diagram in which 360 degrees are divided into eight for representing respective directions in accordance with the embodiment of the present invention.

A procedure for the aforementioned initial magnetic pole estimation calculating means is shown as follows, including the processing for determining the direction of the torque axis of the AC synchronous motor.

First, the direction (region) of the torque axis is determined in the following manner with reference to the flow chart of FIG. 12.

<Main Routine for Determining Direction (Region) of Torque Axis>

S100: Set a default initial magnetic pole position (currently set initial magnetic pole position) to zero. Also, set a safe_area determination flag to zero. Go to S101.

S101: Input a first cyclic period of a waveform generated by a command speed waveform generating means as a shaft determining command speed pattern. Go to S102.

S102: Subtract a detected speed from a shaft determining command speed in the speed deviation calculating means. Go to S103.

S103: Multiply the speed deviation by a speed proportional integral gain to calculate a command torque (command current) in the speed proportional integral control unit. However, clear an integration term of a speed integration gain at an instance the direction of the torque axis is switched. Go to S104.

S104: Input a command torque (command current) to a q-axis command current, and input zero to a d-axis command current. Go to S105.

S105: Go to S107 if the result given by the excessive speed deviation determining means shows "Speed Deviation≧Speed Deviation Limit Level." Otherwise, go to S106.

S106: Go to S108 if a command speed terminates. Otherwise, go to S101.

S107: Substitute one into sp_err. Go to S108.

S108: Determine a direction in which the command torque (command current) is supplied by a "subroutine for determining the direction of the torque axis." Go to S109.

S109: If the safe_area determination flag is zero, go to S110. If one, go to S111.

S110: Input again the command speed from the beginning. Go to S101.

S111: Go to step 1 in an "initial magnetic pole estimation routine."

<Subroutine for Determining Direction of Torque Axis>

F1: Assume that the torque axis of the AC synchronous motor exists in a direction (1) in FIG. 15 (set ☐0 to zero degrees). If O.K., go to F11. If N.G., go to F12.

F10: Assume that the torque axis exists in a direction (4) in FIG. 15 (set θ0 to 135 degrees). If O.K., go to F101. If N.G., go to F102.

F11: Assume that the torque axis exists in a direction (8) in FIG. 15 (set θ0 to 315 degrees). If O.K., go to F111. If N.G., go to F112.

F12: Set immediately the torque axis determining command speed to zero, and do nothing until the next shaft determining command speed. Go to F10.

F100: Assume that the torque axis exists in a direction (5) in FIG. 15 (set θ0 to 180 degrees). If O.K., go to F1001. If N.G., go to F1012.

F101: Assume that the torque axis exists in a direction (3) in FIG. 15 (set θ0 to 90 degrees). If O.K., go to F1011. If N.G., go to F1012.

F102: Set immediately the shaft determining command speed to zero, and assume that the torque axis exists in a direction (6) in FIG. 15 (set θ0 to 225 degrees) until the next shaft determining command speed. Go to F100 when the next shaft determining command speed is supplied.

F110: Assume that the torque axis exists in a direction (3) in FIG. 15 (set θ0 to 90 degrees), and set the safe_area determination flag to one.

F111: Assume that the torque axis exists in a direction (7) in FIG. 15 (set θ0 to 270 degrees). If O.K., go to F1111. If N.G., go to F1112.

F112: Set immediately the shaft determining command speed to zero, and assume that the torque axis exists in a direction (2) in FIG. 15 (set θ0 to 45 degrees) until the next shaft determining command speed. Go to F110 when the next shaft determining command speed is supplied.

F1000: Assume that the torque axis exists in a direction (8) in FIG. 15 (set θ0 to 315 degrees), and set the safe_area determination flag to one.

F1001: Assume that the torque axis exists in a direction (7) in FIG. 15 (set θ0 to 270 degrees), and set the safe_area determination flag to one.

F1002: Set immediately the shaft determining command speed to zero, and assume that the torque axis exists in a direction (7) in FIG. 15 (set θ0 to 270 degrees) until the next shaft determining command speed. Go to F1000 when the next shaft determining command speed is supplied.

F1010: Assume that the torque axis exists in a direction (6) in FIG. 15 (set ☐0 to 225 degrees), and set the safe_area determination flag to one.

F1011: Assume that the torque axis exists in a direction (2) in FIG. 15 (set θ0 to 45 degrees). If O.K., go to F10111. If N.G., go to F10112.

F1012: Set immediately the shaft determining command speed to zero, and assume that the torque axis exists in a direction (5) in FIG. 15 (set θ0 to 180 degrees) until the next shaft determining command speed. Go to F1010 when the next shaft determining command speed is supplied.

F1110: Assume that the torque axis exists in a direction (2) in FIG. 15 (set θ0 to 45 degrees), and set the safe_area determination flag to one.

F1111: Assume that the torque axis exists in a direction (1) in FIG. 15 (set θ0 to 0 degrees), and set the safe_area determination flag to one.

F1112: Set immediately the shaft determining command speed to zero, and assume that the torque axis exists in a direction (1) in FIG. 15 (set θ0 to 0 degrees) until the next shaft determining command speed. Go to F1110 when the next shaft determining command speed is supplied.

F10110: Assume that the torque axis exists in a direction (5) in FIG. 15 (set θ0 to 180 degrees), and set the safe_area determination flag to one.

F1011: Assume that the torque axis exists in a direction (4) in FIG. 15 (set θ0 to 135 degrees), and set the safe_area determination flag to one.

F10112: Set immediately the shaft determining command speed to zero, and assume that the torque axis exists in a direction (4) in FIG. 15 (set θ0 to 135 degrees) until the next shaft determining command speed. Go to F10110 when the next shaft determining command speed is supplied.

<Initial Magnetic Pole Estimation Routine>

Step 1: Set the default initial magnetic pole position θ0 as an arbitrary angle (E101)

Step 1A: Set a data deviation limit level (E101A)

Step 2: Set a command speed pattern (an amplitude value of a command speed, an acceleration section time, a constant speed section time, a pause section time, a mode switching section time) in the command speed pattern generating means, and generate an optimal command speed pattern (trapezoidal wave, triangular wave, rectangular wave, zero-speed wave, sinusoidal wave) for an application field to which it is applied (E102, E105).

Step 3: Set a data acquisition speed section (see Table 2) and data acquired for magnetic pole estimation in the data acquisition speed section (maximum command current, average command current, instantaneous command current) based on the command speed pattern generated at E102 (E103, E104)

Step 4: Subtract a detected speed from the command speed to calculate a speed deviation (E106).

Step 5: Multiply the speed deviation by a speed gain (any of a speed proportion gain, a speed proportion integration gain, and a speed integration gain) to calculate a command torque (command current) (E107).

Step 6: Determine a mode section (the first cyclic section and second cyclic section) from the command speed in the mode section determining means, and perform a switching operation from the first cyclic section to the second cyclic section in accordance with the result in the mode switch (E109).

Perform processing associated with an integration term of the speed integration gain (the integration term is cleared, held or the like) in a speed integration processing means at an instance the mode switching is performed by the mode switch (E108).

Step 7: Perform operations from step 8A to step 8C (E1101–E1104) in the first cyclic period found at E109, or perform the operations from step 9A to step 9C (E1201–E1205) in the second cyclic section found at E107.

Step 8A: Input the command torque (command current) calculated at step 5 to the q-axis command current, and input zero to the d-axis command current (E1101).

Step 8B: Determine whether the command speed is a data acquisition speed section, and calculate first command current data (first command torque data) from the command torque in the determined section (E1102, E1103).

Step 8C: Store the first command current data in a memory by the first memory storing means (E1104).

Step 9A: Input zero to the q-axis command current, and input the command torque (command current) calculated at step 5 to the d-axis command current (E1201).

Step 9B: Determine whether the command speed is a data acquisition speed section, and calculate second command current data (second command torque data) from the command torque in the determined section (E1202, E1203)

Step 9C: Store the second command current data in a memory by the second memory storing means (E1204).

Step 10: Call the first and second command current data from the memories after the end of the second cyclic section of the command speed (E1205) (E110).

Step 11: Calculate the difference between the first command current data and second command current data called at E110 as a data deviation (E110A).

Step 12: Compare the data deviation with a data deviation limit level, and when the result shows "data deviation≧data deviation limit level," calculate again from E105 after a change to a predefined phase (E110B, E110C).

Step 12A: Compare the data deviation with a data deviation limit level, and when the result shows "data deviation<data deviation limit level," calculate an estimated initial magnetic pole position in the estimated initial magnetic pole calculating means using Equation (8), using the first command current data and second command current data called at E110 (E111).

Step 13: Add the estimated initial magnetic pole position θest to the default initial magnetic pole position θ0 to calculate a compensated initial magnetic pole position θcomp in the compensated initial magnetic pole calculating means using Equation (9) (E112).

As described above, according to the embodiment of the present invention, the following effects are produced: 1) a correct initial magnetic pole position estimation can be accomplished in a short estimation time; 2) a maximum torque can be generated while minimizing a torque loss; and 3) a range in which the motor moves can be minimized.

INDUSTRIAL APPLICABILITY

As described above, according to the present invention, the following effects are produced:

1) a correct initial magnetic pole position estimation can be accomplished in a short estimation time;

2) a maximum torque can be generated while minimizing a torque loss; and 3) a range in which the motor moves can be minimized.

What is claimed is:

1. An initial magnetic pole estimating apparatus for an AC synchronous motor, equipped in an AC synchronous motor controller comprising speed control means for calculating a command torque, command current, from a command speed, current control means for driving the AC synchronous motor in accordance with the command torque, command current, and a PWM power converter, said initial magnetic pole estimating apparatus characterized by having:

speed deviation calculating means for subtracting a detected speed from said command speed generated by command speed pattern generating means to calculate a speed deviation;

a speed gain control unit for multiplying said speed deviation by a speed gain to calculate a command torque, command current;

mode section determining means for determining a mode section, a first cyclic section and a second cyclic section, from said command speed;

a mode switch for switching a mode section to any of said first cyclic section and said second cyclic section in accordance with a result in said mode section determining means;

data acquisition speed section determining means for determining whether said command speed is in a data acquisition speed section when said first cyclic section is selected;

a first command torque calculating means, first command current calculating means, for calculating first command torque data, first command current data, from said command torque, said command current, in said determined data acquisition speed section;

data acquisition speed section determining means for determining whether said command speed is in said data acquisition speed section when said second cyclic section is selected;

second command torque calculating means, second command current calculating means, for calculating second command torque data, second command current data, from said command torque, said command current, in said determined data acquisition speed section; and estimated initial magnetic pole calculating means for calculating an estimated initial magnetic pole position using information on said first command torque data, said first command current data, and said second command torque data, said second command current data.

2. An initial magnetic pole estimating apparatus for an AC synchronous motor equipped in an AC synchronous motor controller comprising:

PWM power converting means for converting a direct current voltage to an arbitrary alternate current voltage to drive the AC synchronous motor;

three-phase current detecting means for detecting a three-phase current of said AC synchronous motor;

an electric angle detecting means for detecting a relative electric angle of said AC synchronous motor;

three-phase/two-phase coordinate conversion calculating means for performing a three-phase/two-phase coordinate conversion from a detected three-phase current to a detected two-phase current using said detected electric angle;

detected speed calculating means for calculating a detected speed from said detected electric angle;

two-phase current error calculating means for subtracting said detected two-phase current from a two-phase command current comprised of a q-axis command current and a d-axis command current to calculate a current error;

a two-phase current proportion integration control unit for multiplying said current error by a two-phase current proportion integration gain to calculate a two-phase command voltage;

two-phase/three-phase coordinate conversion calculating means for performing a two-phase/three-phase coordinate conversion from said two-phase command voltage to a three-phase command voltage using said detected electric angle; and PWM gate pulse calculating means for comparing said three-phase command voltage with a carrier waver to calculate a PWM gate pulse and outputting said PWM gate pulse to said PWM power converting means, said initial magnetic pole estimating apparatus for an AC synchronous motor characterized by having:

default initial magnetic pole setting means for setting a default initial magnetic pole position to zero;

command speed pattern generating means for generating a command speed as a two-cycle waveform;

speed deviation calculating means for subtracting said detected speed from said command speed to calculate a speed deviation;

a speed gain control unit for multiplying said speed deviation by a speed gain to calculate a command torque, command current;

mode section determining means for determining a mode section, a first cyclic section and a second cyclic section, from said command speed;

a mode switch for switching a mode section to any of said first cyclic section and said second cyclic section in accordance with a result in said mode section determining means;

acceleration section determining means for inputting said command torque, said command current, to said q-axis command current and inputting zero to said d-axis command current, when said first cyclic section is selected, and determining whether or not said command speed is in a positive acceleration section;

first command torque calculating means, first command current calculating means, for calculating first maximum command torque data, first maximum command current data, from said command torque which is said determined positive acceleration section;

first memory storing means for storing said first maximum command torque in a memory;

acceleration section determining means for inputting zero to said q-axis command current and inputting said command torque, said command current, to said d-axis command current when said second cyclic section is selected, and determining whether or not said command speed is in a positive acceleration section;

second command torque calculating means, second command current calculating means, for calculating second maximum command torque data, second maximum command current data, from said command torque which is in said determined positive acceleration section;

second memory storing means for storing said second maximum command torque in a memory;

estimated initial magnetic pole calculating means for calling said maximum command torques, first and second maximum command torques, from said memories after said command speed has terminated a second cycle to calculate an estimated initial magnetic pole position using said information; and compensated initial magnetic pole calculating means for adding said estimated initial magnetic pole position to said default initial magnetic pole position to calculate a compensated initial magnetic pole position.

3. An initial magnetic pole estimating apparatus for an AC synchronous motor equipped in an AC synchronous motor controller comprising:

PWM power converting means for converting a direct current voltage to an arbitrary alternate current voltage to drive the AC synchronous motor;

three-phase current detecting means for detecting a three-phase current of said AC synchronous motor;

an electric angle detecting means for detecting a relative electric angle of said AC synchronous motor;

detected speed calculating means for calculating a detected speed from said detected electric angle;

three-phase command current calculating means for calculating three-phase command current comprised of a A-phase command current, a B-phase command current and a C-phase command current from a command torque, command current, using said detected electric angle;

three-phase current error calculating means for subtracting said detected three-phase current from a three-phase command current to calculate a current error;

a three-phase current proportion integration control unit for multiplying said current error by a three-phase current proportion integration gain to calculate a three-phase command voltage; and PWM gate pulse calculating means for comparing said three-phase command voltage with a carrier waver to calculate a PWM gate pulse and outputting said PWM gate pulse to said PWM power converting means, said initial magnetic pole estimating apparatus for an AC synchronous motor characterized by having:

default initial magnetic pole setting means for setting a default initial magnetic pole position to zero;

command speed pattern generating means for generating a command speed as a two-cycle waveform;

speed deviation calculating means for subtracting said detected speed from said command speed to calculate a speed deviation;

a speed gain control unit for multiplying said speed deviation by a speed gain to calculate a command torque, command current;

mode section determining means for determining a mode section, a first cyclic section and a second cyclic section, from said command speed;

a mode switch for switching a mode section to any of said first cyclic section and said second cyclic section in accordance with a result in said mode section determining means;

three-phase command current converting means operative when said first cyclic section is selected for adding a shift angle equal to zero degrees to said detected electric angle, without phase change, and calculating said three-phase command current from said command torque, said command current;

acceleration section determining means for determining whether or not said command current is in a positive acceleration section;

first command torque calculating means, first command current calculating means, for calculating a value of a first maximum command torque, first maximum command current, from said command torque which is in said determined positive acceleration section;

first memory storing means for storing said first maximum command torque in a memory;

said three-phase command current converting means operative when said second cyclic section is selected for adding a shift angle equal to 90 degrees to said detected electric angle, a phase change by 90 degrees, and thereafter calculating said three-phase command current from said command torque, said command current;

acceleration section determining means for determining whether or not said command speed is in a positive acceleration section;

second command torque calculating means, second command current calculating means, for calculating a value of a second maximum command torque, second maximum command current from said command torque which is in said determined positive acceleration section;

second memory storing means for storing said second maximum command torque in a memory;

estimated initial magnetic pole calculating means for calling said maximum command torques, first and second maximum command torques, from said memories after said command speed has terminated a second cycle to calculate an estimated initial magnetic pole position using said information; and compensated initial magnetic pole calculating means for adding said estimated initial magnetic pole position to said default initial magnetic pole position to calculate a compensated initial magnetic pole position.

4. An initial magnetic pole estimating apparatus for an AC synchronous motor according to any one of claims 1–3, characterized in that said command speed pattern generating means is capable of arbitrarily setting an acceleration/deceleration section time and a constant speed section time, arbitrarily setting a speed waveform in the acceleration/deceleration section, and arbitrarily setting an amplitude value for a command speed to generate said command speed as a trapezoidal wave, a triangular wave, a rectangular wave, a zero-speed wave, a sinusoidal wave, and the like as a two-cycle waveform.

5. An initial magnetic pole estimating apparatus for an AC synchronous motor according to any one of claims 1–3, characterized in that said speed gain control unit functions as a speed proportion control unit, a speed proportion integration control unit or a speed integration control unit in a combination of a speed proportion control unit and a speed integration control unit.

6. An initial magnetic pole estimating apparatus for an AC synchronous motor according to any one of claims 1–3, characterized in that said current control means is a dq current control means, vector current control means, or three-phase current control means.

7. An initial magnetic pole estimating apparatus for an AC synchronous motor according to any one of claims 1–3, characterized in that in said dq current control means used as said current control means, said command current is inputted to the q-axis command current, and a constant value is inputted to the d-axis command current in said first cyclic section, and said command current is inputted to the d-axis command current, and a constant value is inputted to the q-axis command current in said second cyclic section.

8. An initial magnetic pole estimating apparatus for an AC synchronous motor according to any one of claims 1–7, characterized in that said constant value is an arbitrary number.

9. An initial magnetic pole estimating apparatus for an AC synchronous motor according to any one of claims 1–3, characterized in that in said three-phase current control means used as said current control means, in said first cyclic section, after a shift angle equal to zero degrees is added to said detected electric angle, without phase change, said command torque, said command current, is converted to a three-phase command current as shown in the following equations, and in said second cyclic section, after a shift angle equal to 90 degrees is added to said detected electric angle, phase change by 90 degrees, said command torque (said command current) is converted to a three-phase command current as shown in the following equations:

$$Ia^* = I^* \times \cos(\theta fb - \theta shift)$$

$$Ib^* = I^* \times \cos(\theta fb - \theta shift - 120 \text{ degrees})$$

$$Ic^* = I^* \times \cos(\theta fb - \theta shift - 240 \text{ degrees})$$

where I* is a command torque, command current;

θfb is a detected electric angle, relative position;

θshift is a shift angle, zero degrees in the first cyclic section, and 90 degrees in the second cyclic section;

Ia* is an A-phase command current;

Ib* is a B-phase command current; and

Ic* is a C-phase command current.

10. An initial magnetic pole estimating apparatus for an AC synchronous motor according to any one of claims 1–3, characterized in that in said current control means, said command torque, said command current, is treated as said command current in said first cyclic section after a shift angle equal to zero degrees is added to said detected electric angle, without phase change and said command torque, said command current, is treated as said command current in said second cyclic section after a shift angle equal to 90 degrees is added to said detected electric angle, phase change by 90 degrees.

11. An initial magnetic pole estimating apparatus for an AC synchronous motor according to any one of claims 1–3, characterized in that said data acquisition speed section is comprised of a combination of a positive acceleration section, a negative acceleration section, a positive deceleration section, a negative deceleration section, a positive constant speed section, and a negative constant speed section.

12. An initial magnetic pole estimating apparatus for an AC synchronous motor according to any one of claims 1–3, characterized in that said data acquisition speed section determining means is acceleration section determining means when said magnetic pole estimating data is acquired in an acceleration section; constant speed section determining means when acquired in a constant speed section; acceleration/constant speed section determining means when acquired in an acceleration section and a constant speed section; deceleration/constant speed section determining means when acquired in a deceleration section and a constant speed section; acceleration/deceleration determining means when acquired in an acceleration section and a deceleration section; and an acceleration/deceleration/constant speed section determining means when acquired in an acceleration section, a deceleration section and a constant speed section.

13. An initial magnetic pole estimating apparatus for an AC synchronous motor according to any one of claims 1–3, characterized in that when said data acquisition speed section determining means is said constant speed section determining means, said magnetic pole estimating data is calculated after said arbitrary time set due to the fact that it can be set from zero to an arbitrary time, however, said arbitrary time is smaller than an end time of said constant speed section, until the end time of said constant speed section.

14. An initial magnetic pole estimating apparatus for an AC synchronous motor according to any one of claims 1–3, characterized by having:
first memory storing means for storing said first command current data calculated in the first cyclic section in a memory; and
second memory storing means for storing said second command current data calculated in the second cyclic section in a memory.

15. An initial magnetic pole estimating apparatus for an AC synchronous motor according to any one of claims 1–3, characterized by calling said command torque data, first and second command torque data, from said memory.

16. An initial magnetic pole estimating apparatus for an AC synchronous motor according to any one of claims 1–3, characterized in that said estimated initial magnetic pole position is calculated as expressed by tan−1, said first command current data/said second command current data, or a combination of cos−1 and sin−1, or said estimated initial magnetic pole position is calculated as expressed by Σ(tan−1 (said first instantaneous command current data/said second instantaneous command current data))/k when said first and second command current data are instantaneous command currents, or calculated from a relationship between said first command current data and said second command current data.

17. An initial magnetic pole estimating apparatus for an AC synchronous motor according to any one of claims 1–3, characterized in that said first command current data and second command current data calculated by said first command current calculating means and said second command current calculating means are a maximum command current, an average command current and an instantaneous command current, wherein the maximum command current is a maximum value calculated from a command current which is in said data acquisition speed section, the average command current is an average of the command current which is in said data acquisition speed section, and the instantaneous command current is a command current which is an instantaneously calculated command current which is in said data acquisition speed section.

18. An initial magnetic pole estimating apparatus for an AC synchronous motor according to any one of claims 1–3, characterized in that in said command speed, a pause section in which said command speed has a zero command speed is provided when switching between positive and negative, and a time for said pause section can be arbitrarily set.

19. An initial magnetic pole estimating apparatus for an AC synchronous motor according to any one of claims 1–3, characterized in that in said command speed, a pause section in which said command speed is zero is provided between a first cyclic section in a first cycle and a second cyclic section in a second cycle, and a section is switched during the pause section.

20. An initial magnetic pole estimating apparatus for an AC synchronous motor according to any one of claims 1–3, characterized in that said command current, a pause section is provided when a forced phase change is performed, and said phase change is performed in said pause section.

21. An initial magnetic pole estimating apparatus for an AC synchronous motor according to any one of claims 1–3, characterized by having speed integration gain processing means for performing speed integration gain processing, clearing, holding and the like of an integration term of said speed gain control unit, when the first cyclic section is switched to the second cyclic section, or when a forced phase change is performed, in said command current.

22. An initial magnetic pole estimating apparatus for an AC synchronous motor according to any one of claims 1–3, characterized in that an axial direction determining command speed provided for determining a direction, region, of a torque axis or a magnetic flux axis of said AC synchronous motor uses a first cyclic waveform of the command speed as a trapezoidal wave, triangular wave, rectangular wave, zero-speed wave or a sinusoidal wave.

23. An initial magnetic pole estimating apparatus for an AC synchronous motor according to any one of claims 1–3, characterized in that a user sets one or more of a speed deviation limit level, a torque limit level, a speed limit level, and a data deviation limit level in a parameter setting memory within said initial magnetic pole estimating apparatus for an AC synchronous motor.

24. An initial magnetic pole estimating apparatus for an AC synchronous motor according to any one of claims 1–3, characterized in that excessive speed deviation determining means compares a speed deviation calculated by subtracting said detected speed from said axial direction determining command speed with said speed deviation limit level to determine an excessive speed deviation of the motor.

25. An initial magnetic pole estimating apparatus for an AC synchronous motor according to any one of claims 1–3, characterized in that excessive torque determining means compares a command torque supplied from said speed control unit with said torque limit level to determine an excessive command torque for the motor.

26. An initial magnetic pole estimating apparatus for an AC synchronous motor according to any one of claims 1–3, characterized in that excessive speed determining means compares said detected speed with said speed limit level to determine an excessive speed for the motor.

27. An initial magnetic pole estimating apparatus for an AC synchronous motor according to any one of claims 1–3, characterized by dividing 360 degrees of electric angle by a certain positive integer n, assuming that said torque axis exists in a certain direction within 360 degrees, controlling said AC synchronous motor with an axial direction determining command speed, determining an excessive speed deviation in said excessive speed deviation determining means, and estimating a direction of said torque axis from the determination result.

28. An initial magnetic pole estimating apparatus for an AC synchronous motor according to any one of claims 1–3, characterized by assuming that said torque axis of the AC synchronous motor is in another direction in accordance with the result of the excessive speed deviation determination, and estimating the direction of the torque axis of said AC synchronous motor by repeating said operation of controlling said AC synchronous motor with the axial direction determining command speed, and determining the excessive speed deviation in said excessive speed deviation determining means by a predefined subroutine.

29. An initial magnetic pole estimating apparatus for an AC synchronous motor according to any one of claims 1–3, characterized by estimating the direction of the torque axis of said AC synchronous motor in the axial direction determining means, and thereafter estimating an initial magnetic pole position of said AC synchronous motor in the calculation processing.

30. An initial magnetic pole estimating apparatus for an AC synchronous motor according to any one of claims 1–3, characterized in that excessive data deviation determining means compares a difference between said first command torque data and said second command torque data, data difference, with said data deviation limit level to determine an excessive data deviation.

31. An initial magnetic pole estimating apparatus for an AC synchronous motor according to any one of claims 1–3, characterized by determining an excessive data deviation in said excessive data deviation determining means, and estimating an initial magnetic pole position of said AC synchronous motor after changing to a predefined phase, when the determination result shows data deviation to be greater than or equal to data deviation limit level.

32. An initial magnetic pole estimating apparatus for an AC synchronous motor according to any one of claims 1–3, characterized in that said AC synchronous motor is a rotary motor or a linear motor.

* * * * *